US010888931B2

(12) United States Patent
Michiwaki

(10) Patent No.: US 10,888,931 B2
(45) Date of Patent: Jan. 12, 2021

(54) CUTTING TOOL

(71) Applicant: NejiLaw Inc., Tokyo (JP)

(72) Inventor: Hiroshi Michiwaki, Tokyo (JP)

(73) Assignee: NEJILAW INC., Tokyo (JP)

( * ) Notice: Subject to any disclaimer, the term of this patent is extended or adjusted under 35 U.S.C. 154(b) by 37 days.

(21) Appl. No.: 16/094,835

(22) PCT Filed: Apr. 14, 2017

(86) PCT No.: PCT/JP2017/015371
§ 371 (c)(1),
(2) Date: Oct. 18, 2018

(87) PCT Pub. No.: WO2017/183592
PCT Pub. Date: Oct. 26, 2017

(65) Prior Publication Data
US 2019/0091773 A1 Mar. 28, 2019

(30) Foreign Application Priority Data
Apr. 18, 2016 (JP) ................................ 2016-082800

(51) Int. Cl.
*B23B 27/00* (2006.01)
*B23B 27/22* (2006.01)
(Continued)

(52) U.S. Cl.
CPC ............. *B23B 27/22* (2013.01); *B23B 29/00* (2013.01); *B23B 29/04* (2013.01)

(58) Field of Classification Search
CPC ........... B23B 2270/30; B23B 2210/06; B23B 2220/123; B23B 27/007; B23B 27/065;
(Continued)

(56) References Cited

U.S. PATENT DOCUMENTS 3,963,366 A 6/1976 Eckle
4,222,690 A * 9/1980 Hosoi ................... B23B 51/02
407/54

(Continued)

FOREIGN PATENT DOCUMENTS

CN 2478716 Y 2/2002
CN 1453088 A 11/2003
(Continued)

OTHER PUBLICATIONS

Chinese First Office Action for Chinese Application No. 201780024171.X, dated Sep. 30, 2019, 15 pages with English Translation.
(Continued)

*Primary Examiner* — Sara Addisu
(74) *Attorney, Agent, or Firm* — TraskBritt

(57) ABSTRACT

A cutting tool for performing cutting of a relatively rotating external workpiece while relatively feeding the same in a specified direction is configured to have: cutting sections that have a tool edge, a base section, which is provided as one piece with or separate from the cutting sections and is for holding the cutting sections, a chip-guiding wall, which starts near a tool edge, is formed on the outer circumferential surface of the base section so as to extend in the direction moving away from the tool edge, and is for interfering with chips from the external workpiece and guiding the chips in a direction away from the tool edge. Provided thereby is a cutting tool capable of smoothly discharging chips during cutting.

10 Claims, 27 Drawing Sheets

(51) Int. Cl.
*B23B 29/00* (2006.01)
*B23B 29/04* (2006.01)

(58) Field of Classification Search
CPC ......... B23B 27/22; B23B 29/00; B23B 29/02; B23B 29/04; Y10T 408/907
See application file for complete search history.

(56) References Cited

U.S. PATENT DOCUMENTS

| | | | | |
|---|---|---|---|---|
| 5,038,641 | A | * | 8/1991 | Shen ................... B23B 51/00 408/145 |
| 5,049,011 | A | * | 9/1991 | Bohnet ................ B23B 27/141 408/199 |
| 5,156,503 | A | * | 10/1992 | Tsujimura ........... B23B 27/007 408/187 |
| 5,823,720 | A | | 10/1998 | Moore |
| 5,873,683 | A | * | 2/1999 | Krenzer ................ B23B 27/22 408/230 |
| 5,964,553 | A | * | 10/1999 | Blomberg ......... B23B 51/0493 408/224 |
| 5,971,673 | A | * | 10/1999 | Berglund ............. B23B 51/02 408/1 R |
| 7,393,163 | B2 | * | 7/2008 | Edvardsson ....... B23B 51/048 408/230 |
| 9,308,587 | B2 | * | 4/2016 | Kitagawa ........... B23B 27/007 |
| 9,421,622 | B2 | * | 8/2016 | Segev ................ B23B 51/048 |
| 2004/0005200 | A1 | | 1/2004 | Heule et al. |
| 2004/0042859 | A1 | * | 3/2004 | Edvardsson ......... B23B 51/02 408/230 |
| 2007/0183856 | A1 | * | 8/2007 | Jansson .............. B23B 27/007 407/66 |
| 2011/0097167 | A1 | * | 4/2011 | Inoue .................. B23B 27/007 407/102 |
| 2011/0243674 | A1 | * | 10/2011 | Kitagawa ........... B23B 27/007 408/199 |
| 2011/0305534 | A1 | * | 12/2011 | Park .................... B23B 27/141 407/100 |
| 2012/0282054 | A1 | * | 11/2012 | Jager .................. B23B 27/145 408/200 |
| 2012/0301234 | A1 | * | 11/2012 | Yamaguchi .......... B23B 51/048 407/100 |
| 2014/0212226 | A1 | * | 7/2014 | Saji ....................... B23C 5/06 407/33 |
| 2015/0298223 | A1 | * | 10/2015 | Kumoi ................. B23C 5/109 407/102 |
| 2016/0082518 | A1 | * | 3/2016 | Sakai .................. B23B 27/143 82/1.11 |
| 2019/0344356 | A1 | * | 11/2019 | Kodama .............. C23C 16/403 |
| 2019/0375024 | A1 | * | 12/2019 | Iwasaki .............. B23B 27/1603 |

FOREIGN PATENT DOCUMENTS

| | | |
|---|---|---|
| CN | 2767014 Y | 3/2006 |
| CN | 101842501 A | 9/2010 |
| CN | 102066026 A | 5/2011 |
| CN | 102205427 A | 10/2011 |
| JP | 1975-074285 A | 6/1975 |
| JP | 58-126102 A | 8/1983 |
| JP | 1986-208907 A | 9/1986 |
| JP | 08-257837 A | 10/1996 |
| JP | 2005-279855 A | 10/2005 |
| JP | 2007-185765 A | 7/2007 |
| JP | 2009-027250 A | 2/2009 |
| JP | 4663813 B2 | 4/2011 |
| JP | 2011-224770 A | 11/2011 |
| JP | 5168398 B2 | 3/2013 |
| JP | 2014-069286 A | 4/2014 |
| JP | 2015-074043 A | 4/2015 |
| WO | 2009/157540 A1 | 12/2009 |

OTHER PUBLICATIONS

International Written Opinion for International Application No. PCT/JP2017/015371 dated Jul. 25, 2017, 4 pages
International Search Report for International Application No. PCT/JP2017/015371 dated Jul. 25, 2017, 2 pages.
European Extended Search Report and Opinion for European Application No. 17785930.3, dated Nov. 18, 2019, 9 pages.

\* cited by examiner (A) 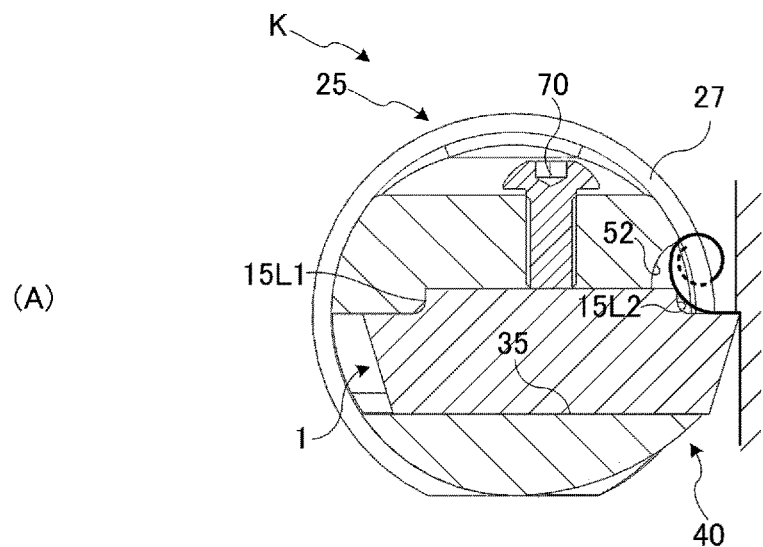
(B) 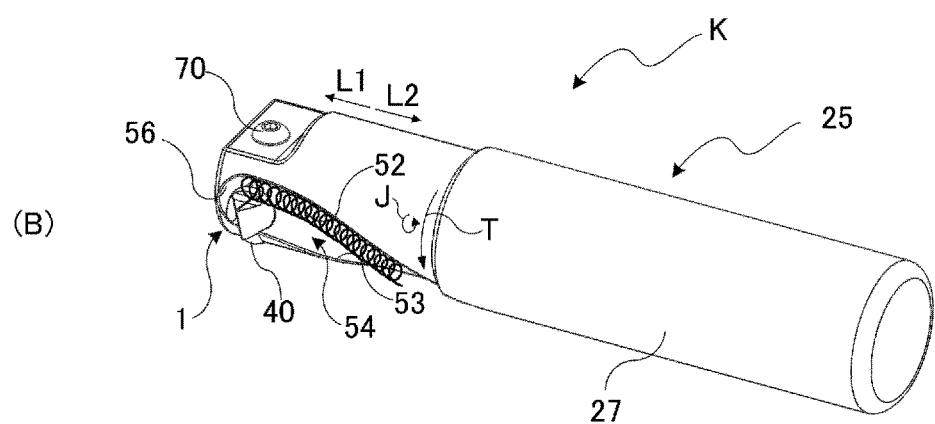
(C) 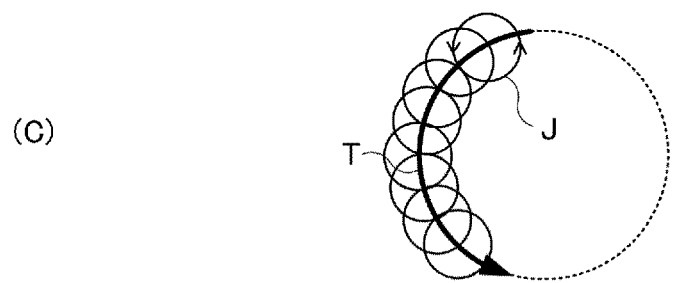
FIG. 6

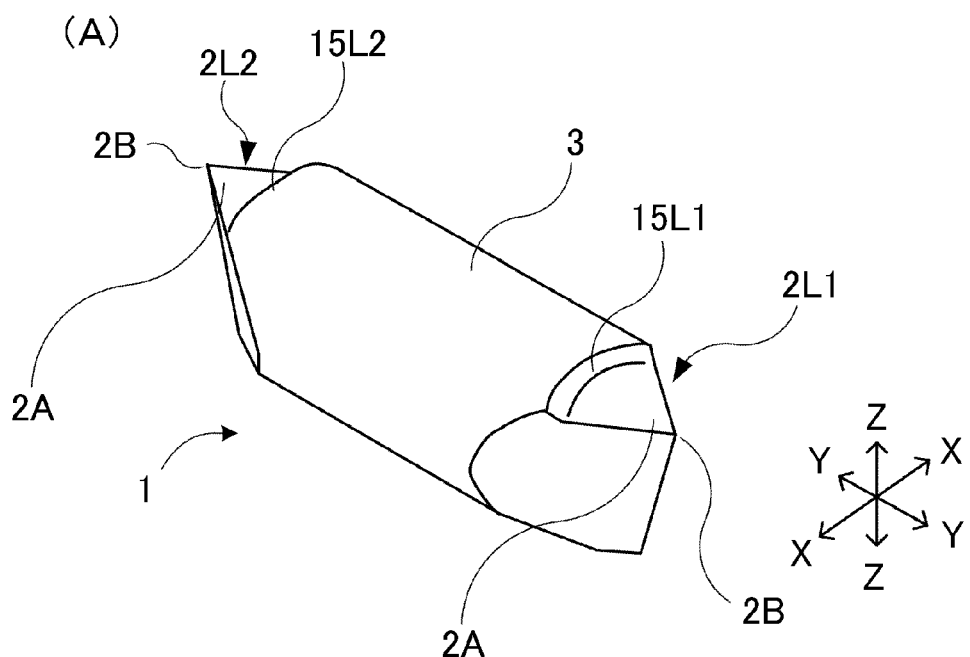
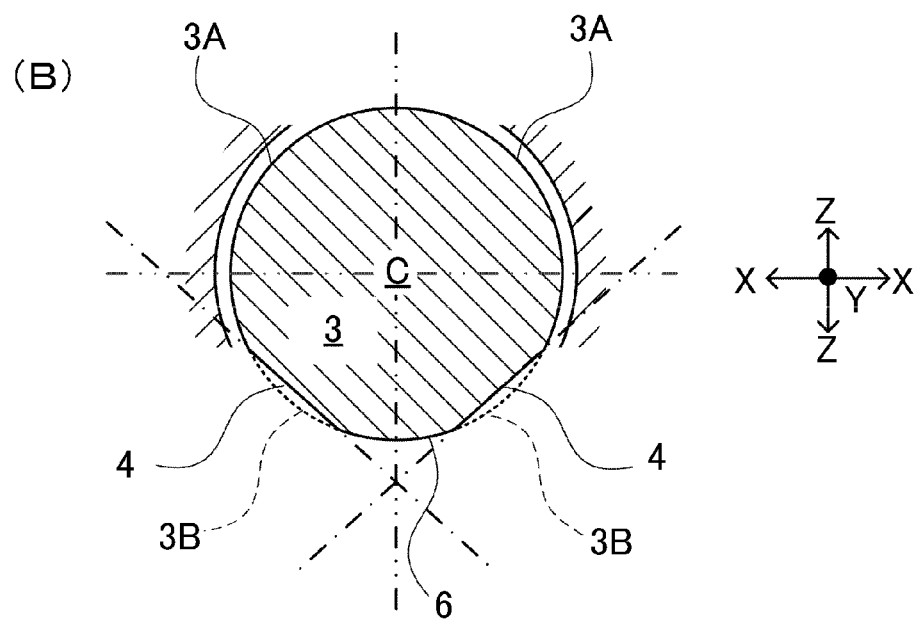
FIG. 7

(A)
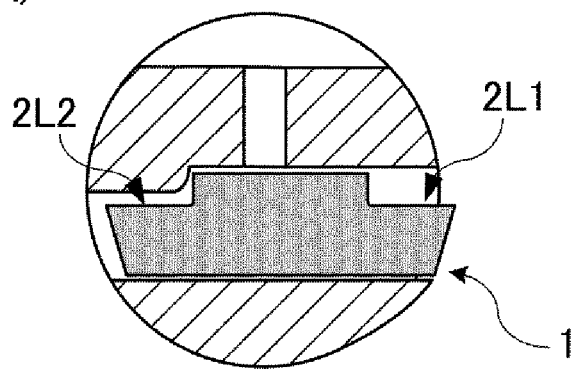
(B)
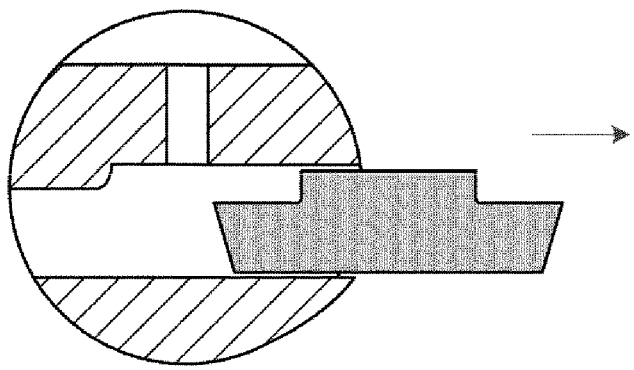
(C)
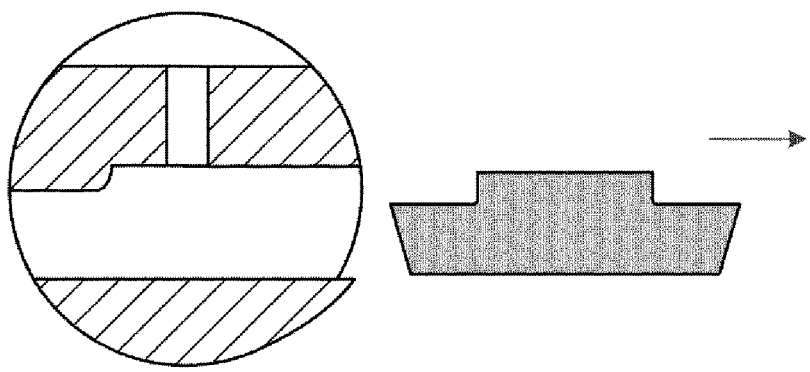
FIG. 9

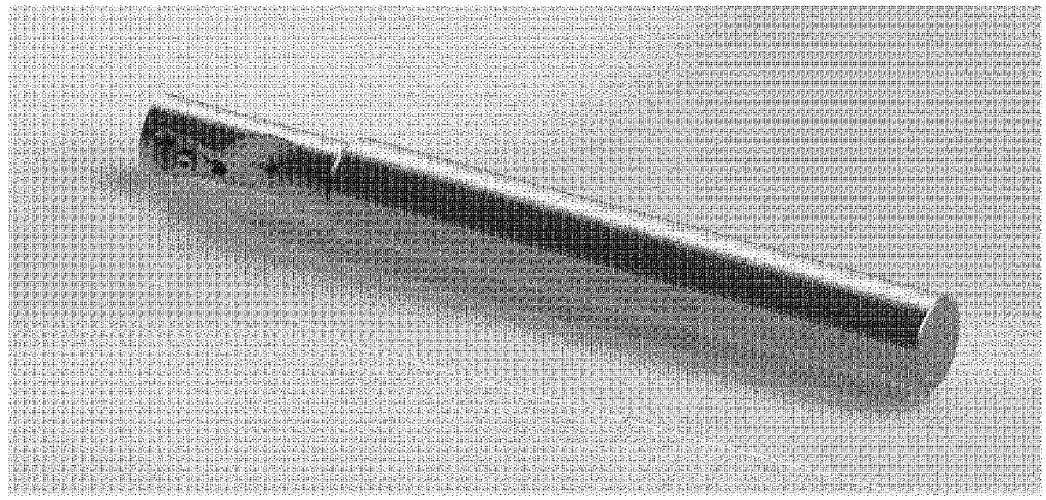
(A)
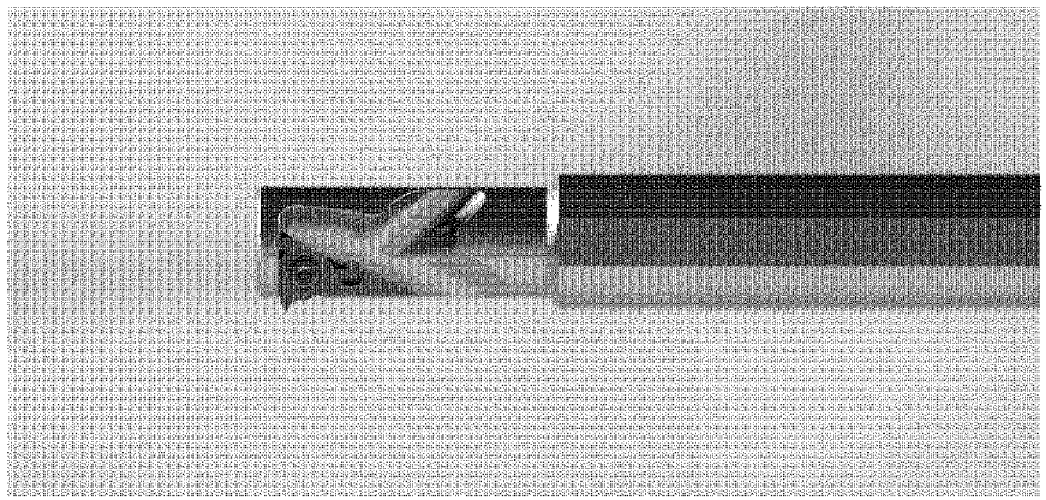
(B)
FIG. 12

(A)
(B)
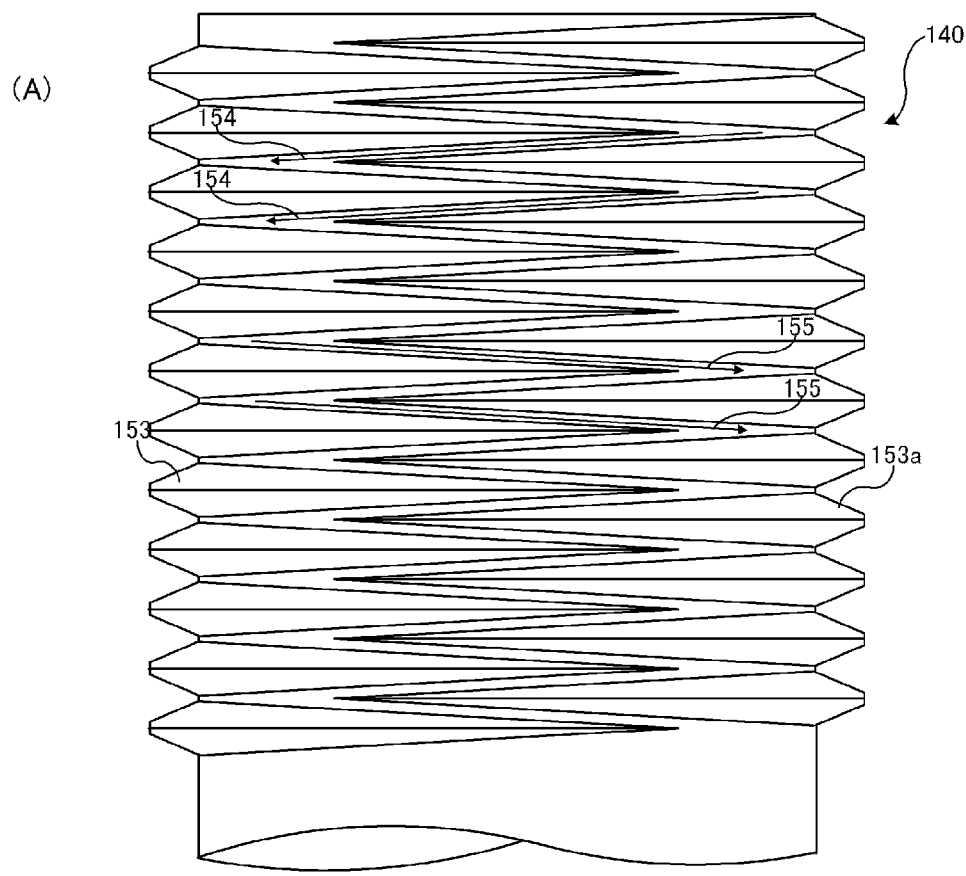
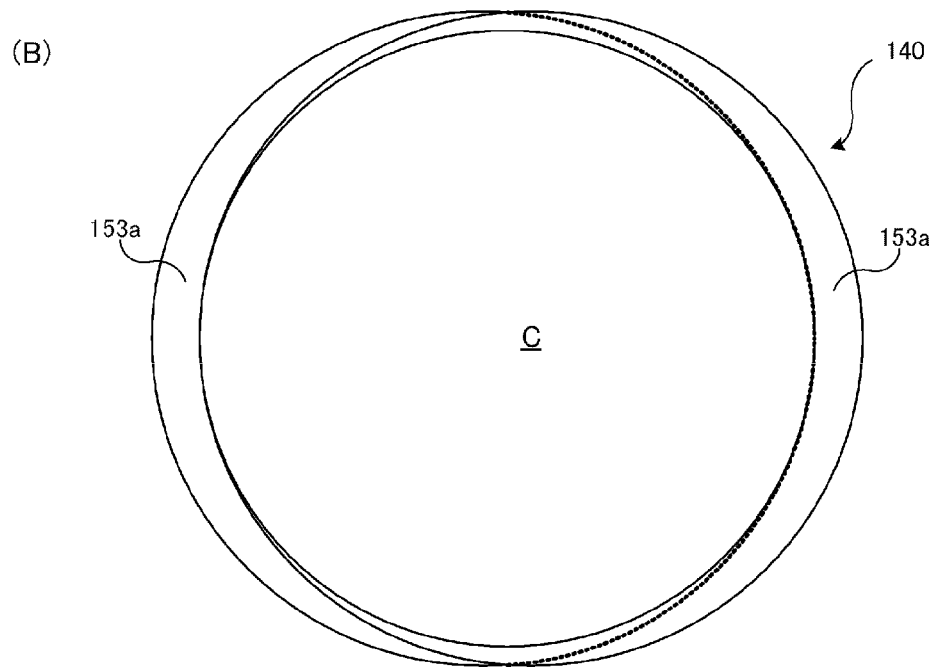
FIG. 16

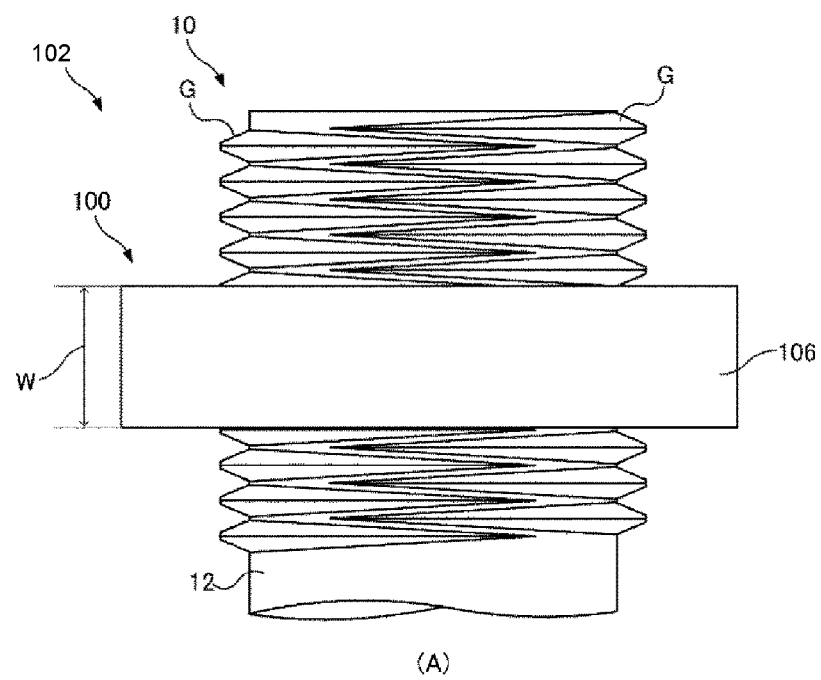
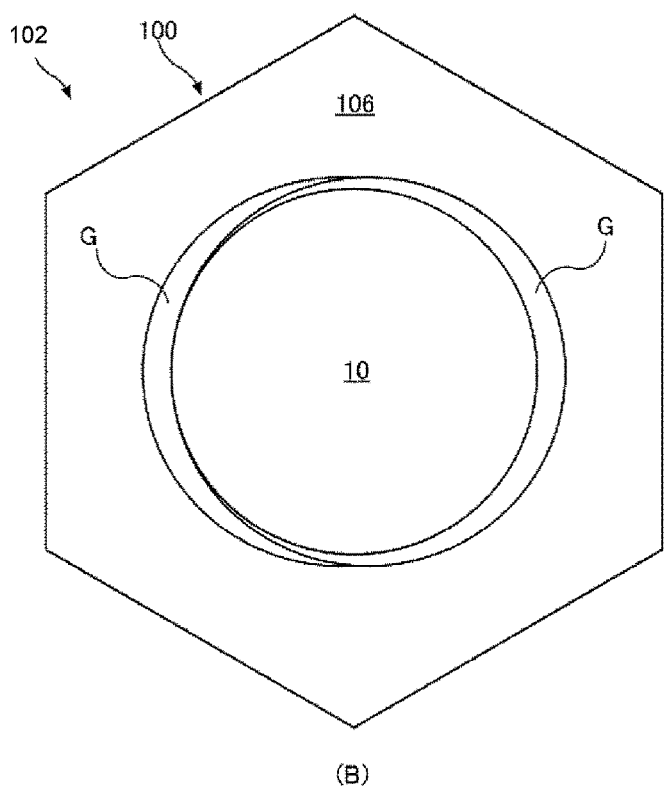
FIG. 17

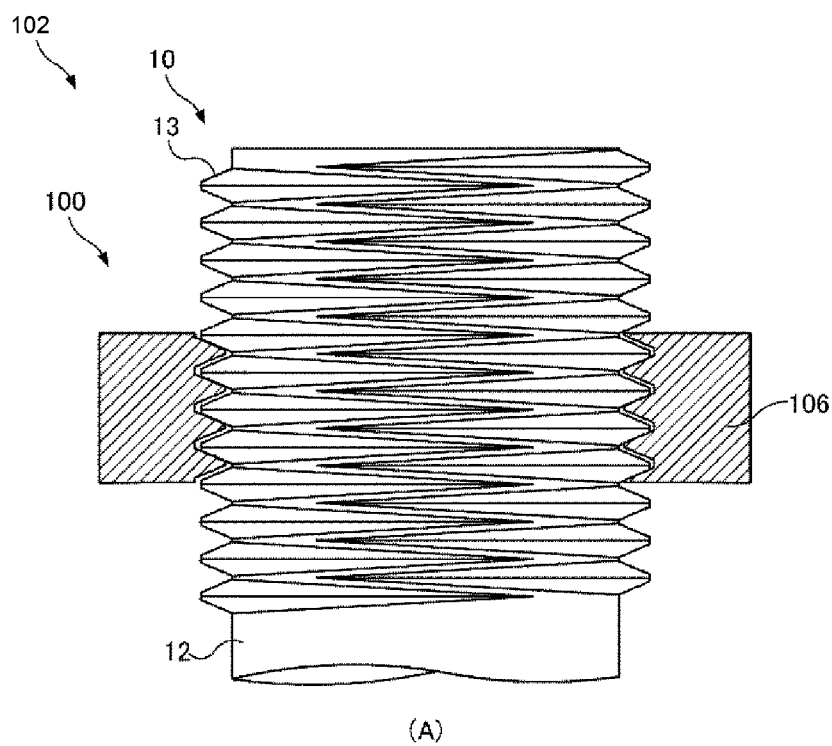
(A)
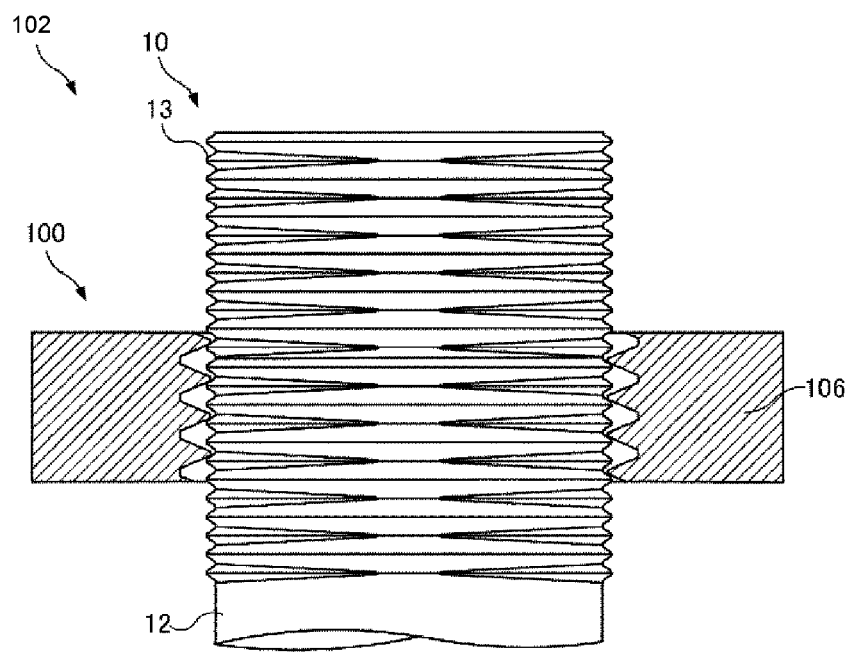
(B)
FIG. 18

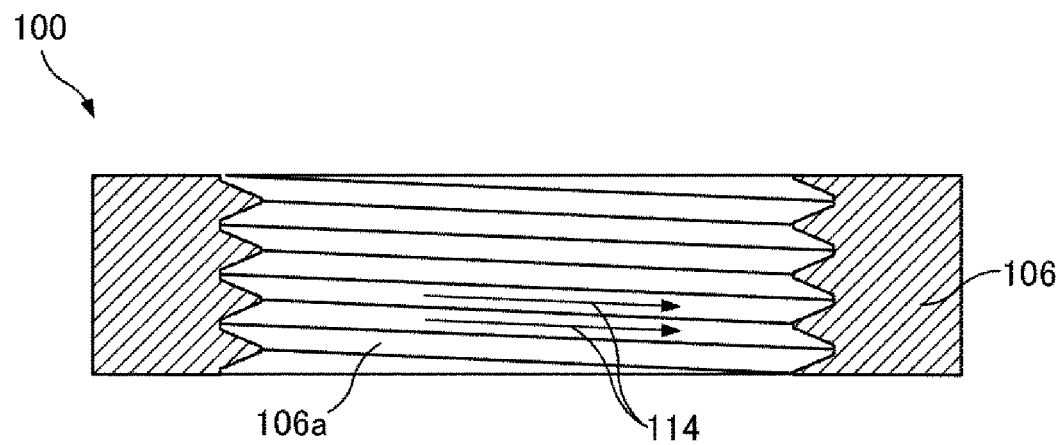
(A)
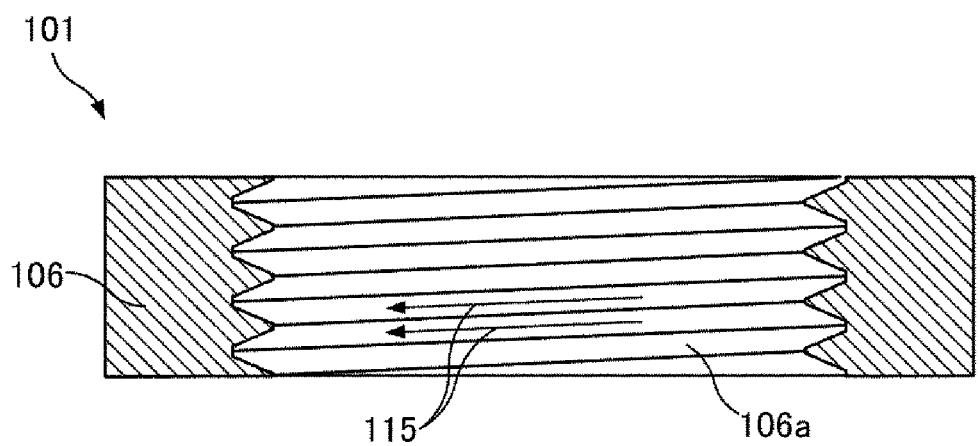
(B)
FIG. 19

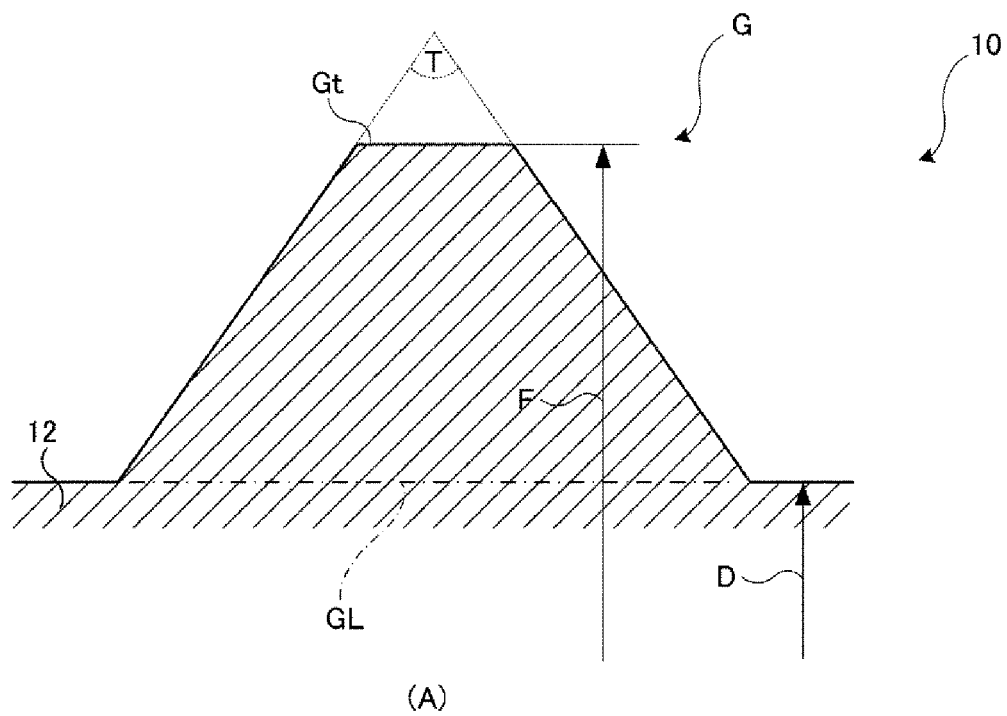
(A)
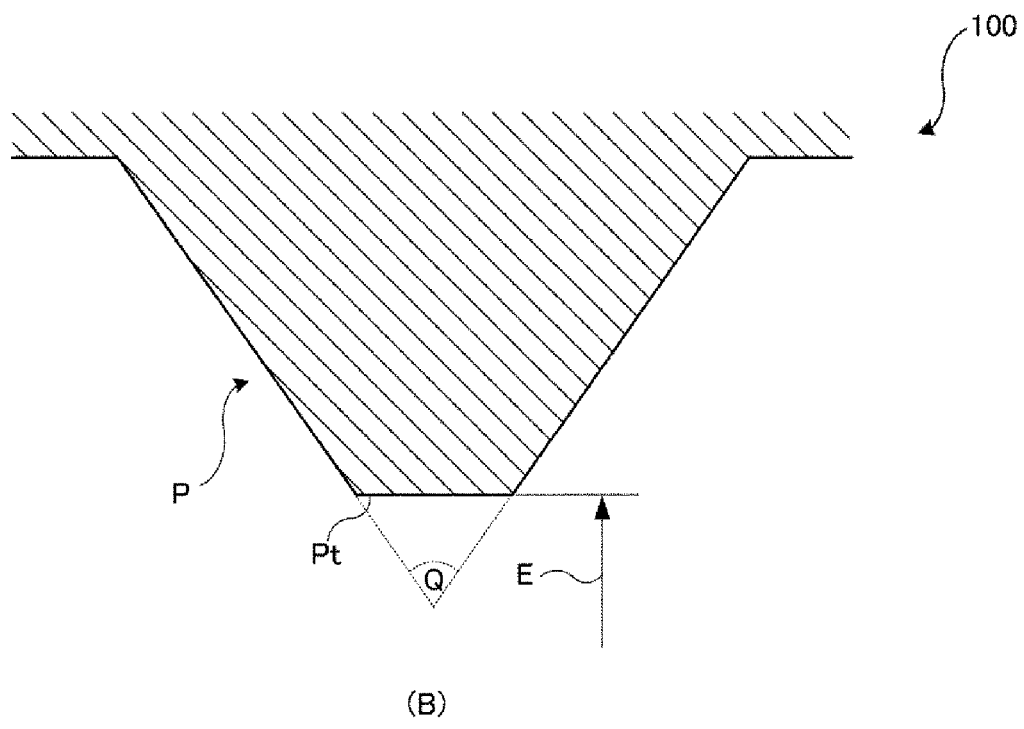
(B)
FIG. 22

(A)

| | T1 | T2 | T3 | ... | ... | ... | ... | ... | T$_{n-2}$ | T$_{n-1}$ | T$_n$ |
|---|---|---|---|---|---|---|---|---|---|---|---|
| Dn | T1 D$_n$ | T2 D$_n$ | T3 D$_n$ | ... D$_n$ | ... D$_n$ | ... D$_n$ | ... D$_n$ | ... D$_n$ | T$_{n-2}$ D$_n$ | T$_{n-1}$ D$_n$ | T$_n$ D$_n$ |
| D$_{n-1}$ | T1 D$_{n-1}$ | T2 D$_{n-1}$ | T3 D$_{n-1}$ | ... D$_{n-1}$ | ... D$_{n-1}$ | ... D$_{n-1}$ | ... D$_{n-1}$ | ... D$_{n-1}$ | T$_{n-2}$ D$_{n-1}$ | T$_{n-1}$ D$_{n-1}$ | T$_n$ D$_{n-1}$ |
| D$_{n-2}$ | T1 D$_{n-2}$ | T2 D$_{n-2}$ | T3 D$_{n-2}$ | ... D$_{n-2}$ | ... D$_{n-2}$ | ... D$_{n-2}$ | ... D$_{n-2}$ | ... D$_{n-2}$ | T$_{n-2}$ D$_{n-2}$ | T$_{n-1}$ D$_{n-2}$ | T$_n$ D$_{n-2}$ |
| ... | T1 ... | T2 ... | T3 ... | ... | ... | ... | ... | ... | T$_{n-2}$ ... | T$_{n-1}$ ... | T$_n$ ... |
| ... | T1 ... | T2 ... | T3 ... | ... | ... | ... | ... | ... | T$_{n-2}$ ... | T$_{n-1}$ ... | T$_n$ ... |
| ... | T1 ... | T2 ... | T3 ... | ... | ... | ... | ... | ... | T$_{n-2}$ ... | T$_{n-1}$ ... | T$_n$ ... |
| ... | T1 ... | T2 ... | T3 ... | ... | ... | ... | ... | ... | T$_{n-2}$ ... | T$_{n-1}$ ... | T$_n$ ... |
| ... | T1 ... | T2 ... | T3 ... | ... | ... | ... | ... | ... | T$_{n-2}$ ... | T$_{n-1}$ ... | T$_n$ ... |
| D3 | T1 D3 | T2 D3 | T3 D3 | ... D3 | ... D3 | ... D3 | ... D3 | ... D3 | T$_{n-2}$ D3 | T$_{n-1}$ D3 | T$_n$ D3 |
| D2 | T1 D2 | T2 D2 | T3 D2 | ... D2 | ... D2 | ... D2 | ... D2 | ... D2 | T$_{n-2}$ D2 | T$_{n-1}$ D2 | T$_n$ D2 |
| D1 | T1 D1 | T2 D1 | T3 D1 | ... D1 | ... D1 | ... D1 | ... D1 | ... D1 | T$_{n-2}$ D1 | T$_{n-1}$ D1 | T$_n$ D1 |
| | T1 | T2 | T3 | ... | ... | ... | ... | ... | T$_{n-2}$ | T$_{n-1}$ | T$_n$ |

(B)

| | Q1 | Q2 | Q3 | ... | ... | ... | ... | ... | Q$_{n-2}$ | Q$_{n-1}$ | Q$_n$ |
|---|---|---|---|---|---|---|---|---|---|---|---|
| En | Q1 E$_n$ | Q2 E$_n$ | Q3 E$_n$ | ... E$_n$ | ... E$_n$ | ... E$_n$ | ... E$_n$ | ... E$_n$ | Q$_{n-2}$ E$_n$ | Q$_{n-1}$ E$_n$ | Q$_n$ E$_n$ |
| E$_{n-1}$ | Q1 E$_{n-1}$ | Q2 E$_{n-1}$ | Q3 E$_{n-1}$ | ... E$_{n-1}$ | ... E$_{n-1}$ | ... E$_{n-1}$ | ... E$_{n-1}$ | ... E$_{n-1}$ | Q$_{n-2}$ E$_{n-1}$ | Q$_{n-1}$ E$_{n-1}$ | Q$_n$ E$_{n-1}$ |
| E$_{n-2}$ | Q1 E$_{n-2}$ | Q2 E$_{n-2}$ | Q3 E$_{n-2}$ | ... E$_{n-2}$ | ... E$_{n-2}$ | ... E$_{n-2}$ | ... E$_{n-2}$ | ... E$_{n-2}$ | Q$_{n-2}$ E$_{n-2}$ | Q$_{n-1}$ E$_{n-2}$ | Q$_n$ E$_{n-2}$ |
| ... | Q1 ... | Q2 ... | Q3 ... | ... | ... | ... | ... | ... | Q$_{n-2}$ ... | Q$_{n-1}$ ... | Q$_n$ ... |
| ... | Q1 ... | Q2 ... | Q3 ... | ... | ... | ... | ... | ... | Q$_{n-2}$ ... | Q$_{n-1}$ ... | Q$_n$ ... |
| ... | Q1 ... | Q2 ... | Q3 ... | ... | ... | ... | ... | ... | Q$_{n-2}$ ... | Q$_{n-1}$ ... | Q$_n$ ... |
| ... | Q1 ... | Q2 ... | Q3 ... | ... | ... | ... | ... | ... | Q$_{n-2}$ ... | Q$_{n-1}$ ... | Q$_n$ ... |
| ... | Q1 ... | Q2 ... | Q3 ... | ... | ... | ... | ... | ... | Q$_{n-2}$ ... | Q$_{n-1}$ ... | Q$_n$ ... |
| E3 | Q1 E3 | Q2 E3 | Q3 E3 | ... E3 | ... E3 | ... E3 | ... E3 | ... E3 | Q$_{n-2}$ E3 | Q$_{n-1}$ E3 | Q$_n$ E3 |
| E2 | Q1 E2 | Q2 E2 | Q3 E2 | ... E2 | ... E2 | ... E2 | ... E2 | ... E2 | Q$_{n-2}$ E2 | Q$_{n-1}$ E2 | Q$_n$ E2 |
| E1 | Q1 E1 | Q2 E1 | Q3 E1 | ... E1 | ... E1 | ... E1 | ... E1 | ... E1 | Q$_{n-2}$ E1 | Q$_{n-1}$ E1 | Q$_n$ E1 |
| | Q1 | Q2 | Q3 | ... | ... | ... | ... | ... | Q$_{n-2}$ | Q$_{n-1}$ | Q$_n$ |

FIG. 23

(A)
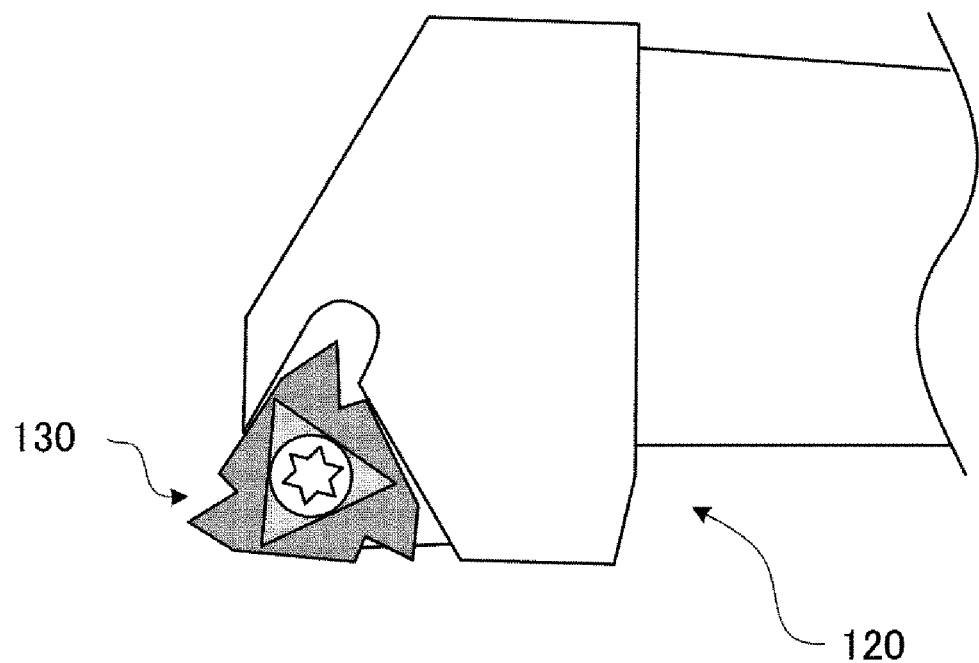
(B)
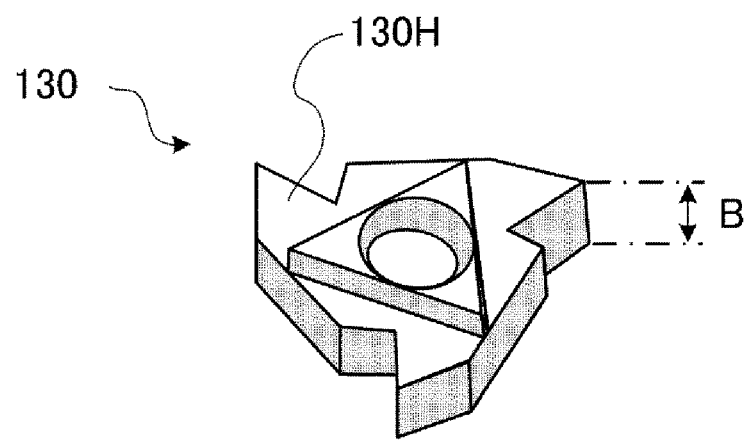
FIG. 29

CUTTING TOOL

CROSS-REFERENCE TO RELATED APPLICATIONS

This application is a national phase entry under 35 U.S.C. § 371 of International Patent Application PCT/JP2017/015371, filed Apr. 14, 2017, designating the United States of America and published as International Patent Publication WO 2017/183592 A1 on Oct. 26, 2017, which claims the benefit under Article 8 of the Patent Cooperation Treaty to Japanese Patent Application Serial No. 2016-082800, filed Apr. 18, 2016.

TECHNICAL FIELD

Embodiments relate to a cutting tool used to cut a workpiece.

BACKGROUND

Conventionally, a so-called bite is used as a cutting tool for cutting a workpiece. The bite performs cutting with respect to a relatively rotating external workpiece while relatively feeding the external workpiece in a predetermined direction. Further, the bite includes a so-called throwaway bite including a cutting tip and a tip holder separately, wherein the cutting tip is replaceable, or a tool bit or a tipped bite including a holder and a tip as one piece.

In particular, a throwaway bite with a replaceable tip is used for mass production by an NC lathe (refer to JP Patent Application Publication No. Hei8-257837).

FIG. 29, Panel (A), illustrates an example of a throwaway bite. The throwaway bite includes a throwaway tip 130 and a holder 120. The throwaway tip 130 is used one time without resharpening in a case of an abrasion or chipping of a tool edge screwed to the tip holder 120. When the tip 130 is held by the exclusive holder 120, a readjustment of a center height thereof is unnecessary, and thus the tip 130 is easily replaceable and efficient for mass production in an NC lathe.

FIG. 29, Panel (B), is a perspective view of a simple body of the throwaway tip 130. The thickness B of the tip is typically less than or equal to 1 centimeter (cm), and the tool edge protrudes from the outer circumference of the tip holder 120 and is mounted.

BRIEF SUMMARY

Technical Goals

The conventional bite forms grooves on a cutting face 130H of the tip 130, curves chips generated by cutting in both directions, and breaks the chips finely. The grooves are referred to as so-called tip breakers. However, in an example in which the chips broken finely by the tip breakers scatter in many directions, or in an example of inner diameter machining or female threading, a hole to be processed is filled with the fine chips.

Further, to perform cutting with higher precision, a cutting tip and a tip holder (bite holder) with less additional chattering than the conventional bite are needed.

In view of the above, an aspect provides a cutting tool capable of smoothly discharging chips generated during cutting. In relation thereto, the aspect provides a cutting tip and a tip holder having a relatively high accuracy of positioning a tool edge and preventing chattering although a cutting resistance is relatively high.

Technical Solutions

According to one aspect of this disclosure, there is provided a cutting tool for performing cutting with respect to an external workpiece while relatively feeding the external workpiece in a predetermined direction, the external workpiece being shaft-supported to relatively rotate, the cutting tool including a cutting section with a tool edge, a base section provided as one piece with, or separate from, the cutting section, the base section configured to hold the cutting section, and a chip-guiding wall starting near the tool edge and being formed on an outer circumferential surface of the base section to extend in a direction away from the tool edge, the chip-guiding wall configured to interfere with a chip from the external workpiece and guide the chip in the direction away from the tool edge.

The chip-guiding wall may be formed spirally on an outer circumference of the base section.

The chip-guiding wall may be configured to turn in a direction opposite to a cutting direction of the tool edge in the direction away from the tool edge.

The chip-guiding wall may be configured to oppose a cutting face of the tool edge.

The base section may be a rod-shaped shank portion, and the tool edge may be disposed to protrude in a radial direction of the shank portion.

The chip-guiding wall may include substantially the same position as the tool edge with respect to a relative feeding direction of the external workpiece and the tool edge and have a tool edge side erect face installed erect with respect to the cutting face of the tool edge.

The chip-guiding wall may be configured to branch into a first guiding wall piece and a second guiding wall piece in the middle of extending in the direction away from the tool edge.

The cutting tool may further include a discharge direction restricting face formed near the tool edge and configured to face a relative feeding direction of the external workpiece and the tool edge.

The discharge direction restricting face may be disposed on a forward side of the tool edge in the relative feeding direction and configured to face a backward side of the tool edge, with respect to the tool edge.

The cutting tool may further include a discharge direction restricting face formed near the tool edge and configured to face a relative feeding direction of the external workpiece and the tool edge, wherein the chip-guiding wall may include substantially the same position as the tool edge with respect to the relative feeding direction of the external workpiece and the tool edge and have a tool edge side erect face installed erect with respect to the cutting face of the tool edge. The discharge direction restricting face and the chip-guiding wall may be continuous.

The cutting tool may be provided for inner diameter machining or female threading.

The cutting tool may include a cutting tip and a tip holder desirably having the following features.

That is, there is provided a cutting tip used in relation to the disclosure for performing cutting on a relatively moving external workpiece, the cutting tip including a columnar main body. A cutting section is positioned at an end portion of the main body, the cutting section having a tool edge, wherein one pair of rake faces extending in a longitudinal direction of the main body may be formed on a circumferential surface and positioned on at least one of both outer sides of a cutting direction of the tool edge of the main body.

A partial cylindrical region having a virtual central axis parallel to the longitudinal direction of the main body may be formed on each of circumferential surfaces, positioned on both outer sides of a transverse direction of a cutting face of the tool edge of the main body.

The one pair of rake faces may be formed on a radially inner side than a circular arc trajectory on an extension line of a partial circular arc corresponding to a cross-section perpendicular to the longitudinal direction of the main body of the partial cylindrical region.

The one pair of rake faces may be symmetrically formed with respect to a reference line extending from a tip of the tool edge in a cutting direction when viewed from the longitudinal direction of the main body.

At least one pair of partial cylindrical regions may have the same center of curvature.

The cutting section may be formed at one end portion of the longitudinal direction of the main body, and the main body may include a positioning face to engage with an external member on one side of the longitudinal direction of the main body.

The cutting section may be formed at each of both ends of the longitudinal direction of the main body, and the main body may include a first positioning face to engage with the external member on one side of the longitudinal direction of the main body, and a second positioning face to engage with the external member on the other side of the longitudinal direction of the main body.

The tip of the tool edge in the cutting section may be symmetrically formed with respect to a reference line extending in the longitudinal direction of the main body when viewed from the cutting direction.

The tool edge may have an end relief angle of 10° or more.

There is provided a cutting tip used in relation to the disclosure for performing cutting on a relatively moving external workpiece, the cutting tip including a cutting side contact face configured to contact an external member being a holder in a cutting direction of the tool edge, and an anti-cutting side contact face configured to contact the external member being the holder on a side opposite to the cutting direction.

The cutting tip may include a positioning face configured to contact the external member in a protruding direction of the tool edge.

Each of the cutting side contact face and the anti-cutting side contact face may include a partial cylindrical region having a virtual central axis parallel to the longitudinal direction of the main body.

Both of the cutting side contact face and the anti-cutting side contact face may be provided by a single partial cylindrical region.

The cutting tip may be obtained by being processed from a cylindrical material.

There is provided a tip holder used in relation to the disclosure for holding a cutting tip at a tip end portion of a holder main body, the tip holder including a tip-receiving hole configured to receive the cutting tip while a tool edge is exposed at the tip end portion of the holder main body.

One pair of rake faces extending in a direction parallel to an axial direction of the tip-receiving hole may be formed on an inner circumferential surface, positioned on at least one of both sides of a transverse direction of a virtual cutting face of the tip-receiving hole.

A partial cylindrical region having a virtual central axis parallel to the axial direction of the tip-receiving hole may be formed on an inner circumferential surface positioned on both sides of the transverse direction of the virtual cutting face.

The one pair of rake faces may be formed on a radially inner side than a partial circular arc trajectory corresponding to a cross-section orthogonal to a virtual central axis of the cylindrical region formed on an inner circumference of the tip-receiving hole.

The one pair of rake faces may be symmetrically formed with respect to the virtual central axis of the tip-receiving hole when viewed from the axial direction.

At least one pair of partial cylindrical regions may have the same center of curvature.

The tip holder may include a bolt hole penetrating through the tip-receiving hole on an outer circumferential surface of the holder main body opposing the rake face, wherein the cutting tip may be fastened thereto by a bolt.

The holder main body may include a hole configured to push the cutting tip out toward a tool edge of the cutting tip in a direction parallel to an axis of the tip-receiving hole.

The tip-receiving hole may include a receiving face opposing in a cutting direction.

The holder main body may include a positioning face to engage with the cutting tip on one side of a longitudinal direction of the holder main body.

A lower jaw portion to receive a cutting section of the tip may be continuous to a bottom face of the tip-receiving hole and protrude from a tip end portion of the holder main body in a longitudinal direction of the tip.

The axial direction of the tip-receiving hole may be perpendicular to the longitudinal direction of the holder main body.

The axial direction of the tip-receiving hole may be parallel to the longitudinal direction of the holder main body.

Effects

According to the embodiments, it is possible to achieve an excellent effect of extremely smoothly discharging chips generated during cutting to an outside.

BRIEF DESCRIPTION OF THE DRAWINGS

FIG. 6, Panel (A), is a view illustrating a chip being curved in a coil shape, FIG. 6, Panel (B), is a view illustrating an example of discharging coil-shaped chips, and FIG. 6, Panel (C), is a view illustrating a winding direction and a turning direction of the chip.

FIG. 7, Panel (A), is a perspective view illustrating a cutting tip used for the cutting tool, and FIG. 7, Panel (B), is a cross-sectional view illustrating the cutting tip and a tip holder being assembled.

FIG. 9, Panels (A) through (C), are diagrams illustrating a series of flows when the cutting tip is pushed out from a tip holder in the cutting tool.

FIG. 12, Panel (A), is a perspective view illustrating the cutting tool, and FIG. 12, Panel (B), is an enlarged top view illustrating a portion of a tip of the cutting tool.

FIG. 16, Panel (A), is a side view illustrating a male threaded portion of a compound screw, and FIG. 16, Panel (B), is a view illustrating threads of a male threaded body when viewed from a vertical direction of a central axis of the screw.

FIG. 17, Panels (A) and (B), are a front view and a plan view illustrating a fastening structure of a male threaded body and a female threaded body cut by a cutting tool according to an embodiment, respectively.

FIG. 18, Panels (A) and (B), are a cross-sectional front view and a cross-sectional side view illustrating the fastening structure, respectively.

FIG. 19, Panel (A), is a cross-sectional front view illustrating the female threaded body, and FIG. 19, Panel (B), is a cross-sectional front view illustrating the female threaded body having a spiral direction opposite to that of the female threaded body.

FIG. 22, Panel (A), is an enlarged cross-sectional view illustrating a cross-sectional shape of a thread of the male threaded body, and Panel (B) is an enlarged cross-sectional view illustrating a cross-sectional shape of a thread of the female threaded body.

FIG. 23, Panel (A), is a matrix illustrating a male threaded body group for verification used in a screw design method according to an embodiment, and Panel (B) is a matrix illustrating a female threaded body group for verification used in a screw design method according to an embodiment.

FIG. 29, Panel (A), is a diagram illustrating a throwaway bite for threading according to a related art, and Panel (B) is a perspective view illustrating a throwaway tip for threading according to a related art.

DETAILED DESCRIPTION

Hereinafter, embodiments will be described in detail with reference to the accompanying drawings.

Figure 1:
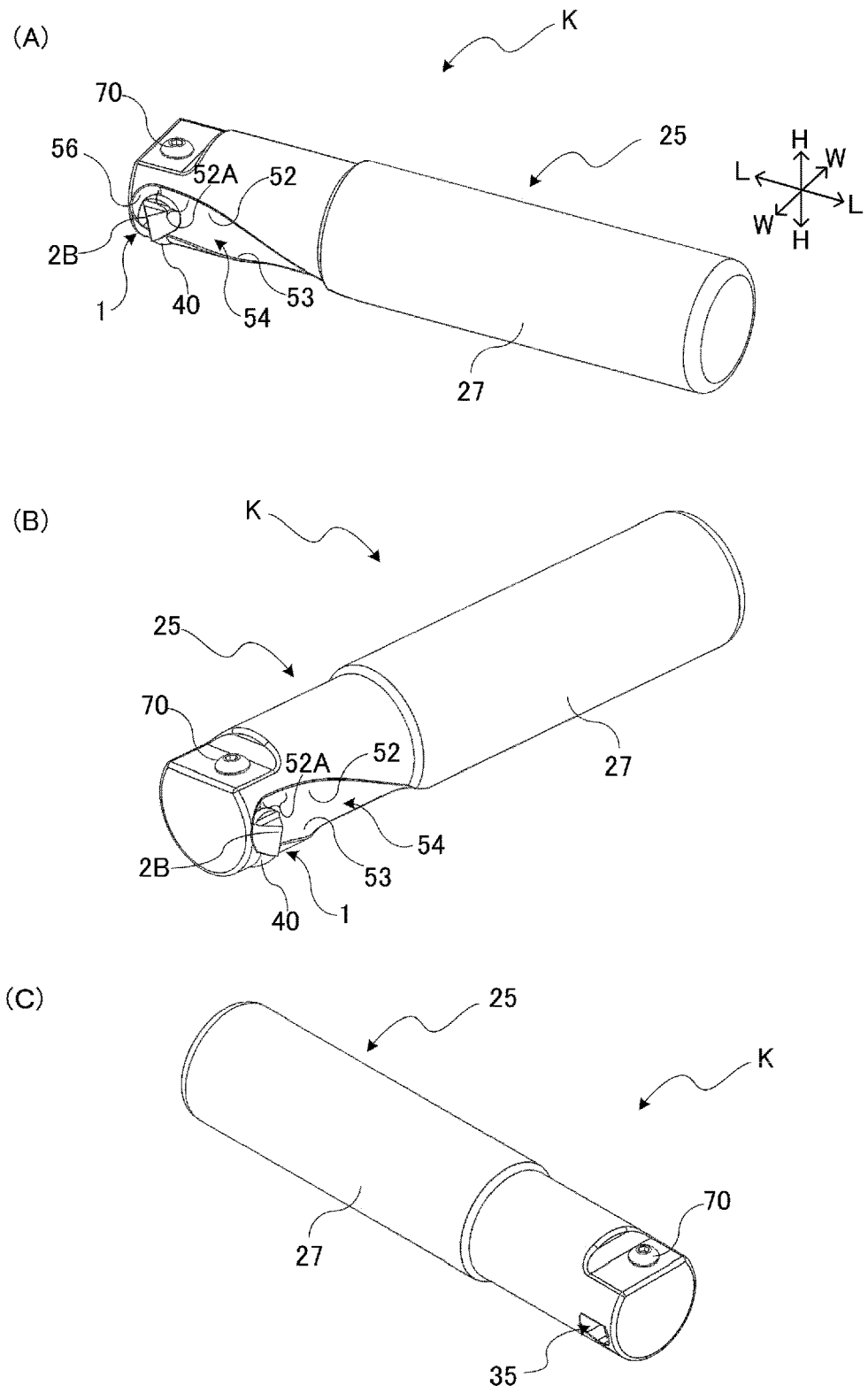
FIG. 1, Panels (A) through (C), are perspective views illustrating a cutting tool according to an embodiment of the present disclosure.

FIG. 1 illustrates a cutting tool K according to an embodiment. The cutting tool K is a cutting tool for performing cutting with respect to a relatively rotating external workpiece while relatively feeding the external workpiece in a predetermined direction (an axial direction of a relative rotational direction), a so-called cutting bite.

Further, the cutting tool K is suitable for inner diameter machining, particularly, for machining female threads on an inner diameter side. However, embodiments are not limited thereto. Here, an example of a so-called throwaway bite including a cutting tip and a tip holder separately, wherein the cutting tip is replaceable, is provided. However, embodiments are not limited thereto, and a tool bit or a tipped bite including a holder and a tip as one piece may also be possible.

The cutting tool K includes a cutting tip 1, and a tip holder 25 to hold the cutting tip 1.

First, the cutting tip (hereinafter, the tip) 1 will be described with reference to FIGS. 7 and 8. As shown in FIG. 7, Panel (A), the tip 1 includes a main body section 3 being a rod-shaped main body, and a cutting section 2L1, 2L2 positioned at an end portion of the main body, the cutting section 2L1, 2L2 with a tool edge. The tip 1 includes a material, desirably, cemented carbide with an excellent balance between hardness and viscosity. The tip 1 may also include a material such as high-speed steel, cermet, or ceramic, and various coatings such as, for example, diamond, diamond-like carbon (DLC), DIA, DG, TiC, TiN, TiCN, TiAlN, CrN, and SiC coatings may be applied to the cutting section. In addition, a process for hardening a base material, for example, nitriding, may be performed.

A partial cylindrical region 3A having a virtual central axis parallel to a longitudinal direction Y of the tip main body is formed on each of circumferential surfaces, positioned on both outer sides of a transverse direction X of a cutting face 2A of a tool edge 2B, of the main body section 3 (refer to FIG. 7, Panel (B)). One pair of rake faces 4 extending in the longitudinal direction Y of the tip main body are formed on a circumferential surface, positioned on at least one of both outer sides of a relative cutting direction Z of the tool edge 2B (a relative moving direction with the external workpiece), of the tip main body. The partial cylindrical regions 3A have the same center of curvature C.

Further, the cutting face 2A includes a stepped portion 15L1, 15L2 installed erect in a relative cutting direction H. The stepped portion 15L1, 15L2 faces the tool edge 2B side, interferes with a chip from the workpiece cut by the tool edge 2B, and curls the chip spirally (refer to FIG. 6, Panel (A)). Further, the stepped portion 15L1, 15L2 also functions as a positioning face for fixing to the holder, of which the details will be described later.

As shown in FIG. 7, Panel (B), the one pair of rake faces 4 are formed on the main body section 3 in a direction opposite to the relative cutting direction Z. The one pair of rake faces 4 are formed on a radially inner side than a circular arc trajectory 3B on an extension line of a partial circular arc corresponding to a cross-section perpendicular to the longitudinal direction Y of the tip main body of the partial cylindrical region 3A. As a result, the tip 1 may be easily prepared by grinding a circular bite of a so-called commercially available tool bit. In addition, for ease of description, a tip-receiving hole of the tip holder is provided on an outer side of the tip 1. However, an inner circumference of the tip-receiving hole and an outer circumference of the tip 1 are provided in substantially the same shape. A rake face (not shown) of the tip holder of the tip-receiving hole and a rake face 4 of the tip 1 contact each other, whereby the tool edge 2B of the tip 1 is positioned accurately with respect to the tip holder.

Figure 8:
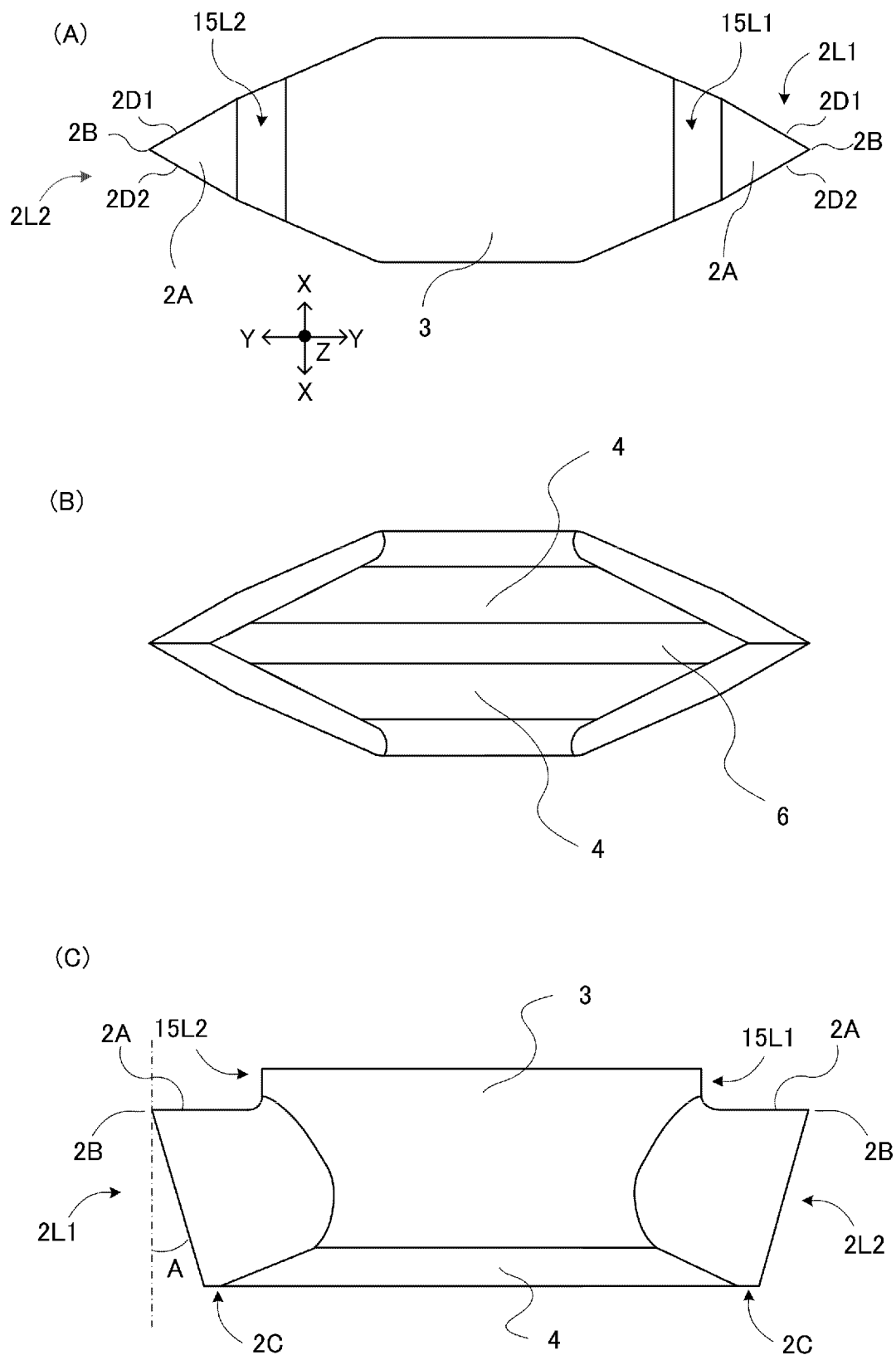
FIG. 8, Panel (A), is a top view illustrating the cutting tip, FIG. 8, Panel (B), is a bottom view illustrating the cutting tip, and FIG. 8, Panel (C), is a side view illustrating the cutting tip.

As shown in FIG. 8, in the tip 1, the cutting section 2L1, 2L2 is formed at each of both ends of the longitudinal direction Y of the tip main body. When viewed from the relative cutting direction Z, a tip end shape of the tool edge 2B of the cutting section 2L1, 2L2 is in a "V" shape, which is symmetric with respect to a reference line extending in the longitudinal direction Y of the tip main body. That is, the tool edge 2B includes two main cutting edges 2D1 and 2D2 symmetrically.

Further, the cutting face 2A is not particularly provided with a structure, excluding the stepped portion 15L1, 15L2 installed erect (flattened). In doing so, the chip may directly contact the stepped portion 15L1, 15L2 and be smoothly curved. In addition, no structure is provided on the surface of the main body section 3. Meanwhile, a horizontal face extending in the longitudinal direction Y of the tip main body is formed on the surface of the main body section 3 so as to easily transmit a vertically downward force when fastened and fixed from the top of the tip 1 and eliminate causes of additional chattering.

As shown in FIG. 8, Panel (B), a bottom portion 6 is installed between the one pair of rake faces 4. A cross-section of the bottom portion 6 is formed as the circular arc trajectory 3B on the extension line of the partial circular arc (refer to FIG. 7, Panel (B)). Thus, the tip 1 is guided by the bottom portion 6 in a longitudinal direction L of the main body and inserted into the tip-receiving hole of the tip holder, whereby the cutting section 2L1, 2L2 is positioned accurately by the one pair of rake faces 4 and the rake face of the tip holder in a direction orthogonal to a main rotation axis of a cutting device (here, the transverse direction X of the cutting face 2A and the relative cutting direction Z). Further, as the bottom face 6, a plane extending in the longitudinal direction Y of the tip main body may be formed.

As shown in FIG. 8, Panel (C), the first and second positioning faces 15L1 and 15L2 serving as the stepped portions 15L1 and 15L2 are formed between the tool edge 2B and the main body section 3. The first positioning face 15L1 may engage with the external member (in detail, the tip holder) on one side of the longitudinal direction Y of the tip main body, and the second positioning face 15L2 may engage with the external member on the other side of the longitudinal direction Y of the main body. A holder side positioning face 60 installed in a tip-receiving hole 35 of the tip holder 25 and the positioning face 15L1, 15L2 contact each other, which will be described later, whereby a deviation of the tip 1 in a direction opposite to the workpiece in the longitudinal direction Y of the tip main body caused by a backward force of a cutting resistance may be prevented.

Further, an end relief angle A of the tool edge 2B is set to 10° or more to prevent interference with the workpiece during inner diameter machining or female screw hole machining. In addition, a height of the positioning face 15L1, 15L2 (here, the height is provided in the relative cutting direction Z, but a height direction thereof appropriately differs depending on a position of the positioning face 15L1, 15L2) is desirably set to 40% or less of a maximum outer dimension of the same height direction of the main body section 3, more desirably set to 25% or less. Similarly, the height of the positioning face 15L1, 15L2 is desirably set to 50% or less of a maximum outer dimension of the height of the cutting section 2L1, 2L2 in the same direction, more desirably set to 30% or less. In either case, by setting the height of the positioning face 15L1, 15L2 to be relatively small, a relatively great height of the cutting section 2L1, 2L2 in the same direction may be secured, and the stiffness of the cutting section 2L1, 2L2 may increase greatly.

Figure 5:
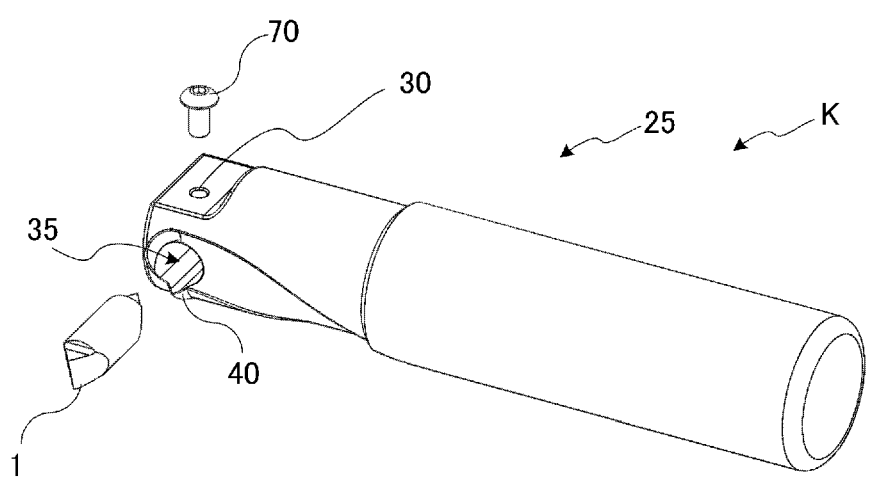
FIG. 5 is an exploded perspective view illustrating the cutting tool.

Next, the structure of the tip holder 25 will be described with reference to FIG. 1, Panels (A) through (C). The tip holder 25 includes a rod-shaped shank portion 27, the tip-receiving hole 35 formed at an end portion of the shank portion 27, a lower jaw portion 40 provided at a lower portion of the tip-receiving hole 35, and a bolt hole 30 of a fastening bolt (refer to FIG. 5). The tip-receiving hole 35 is installed to penetrate in a direction W orthogonal to the longitudinal direction L of the main body of the tip holder 25 in a vicinity of the end portion of the tip holder 25. By inserting and fixing the tip 1 into the tip-receiving hole 35, the cutting tool K is formed.

Figure 4:
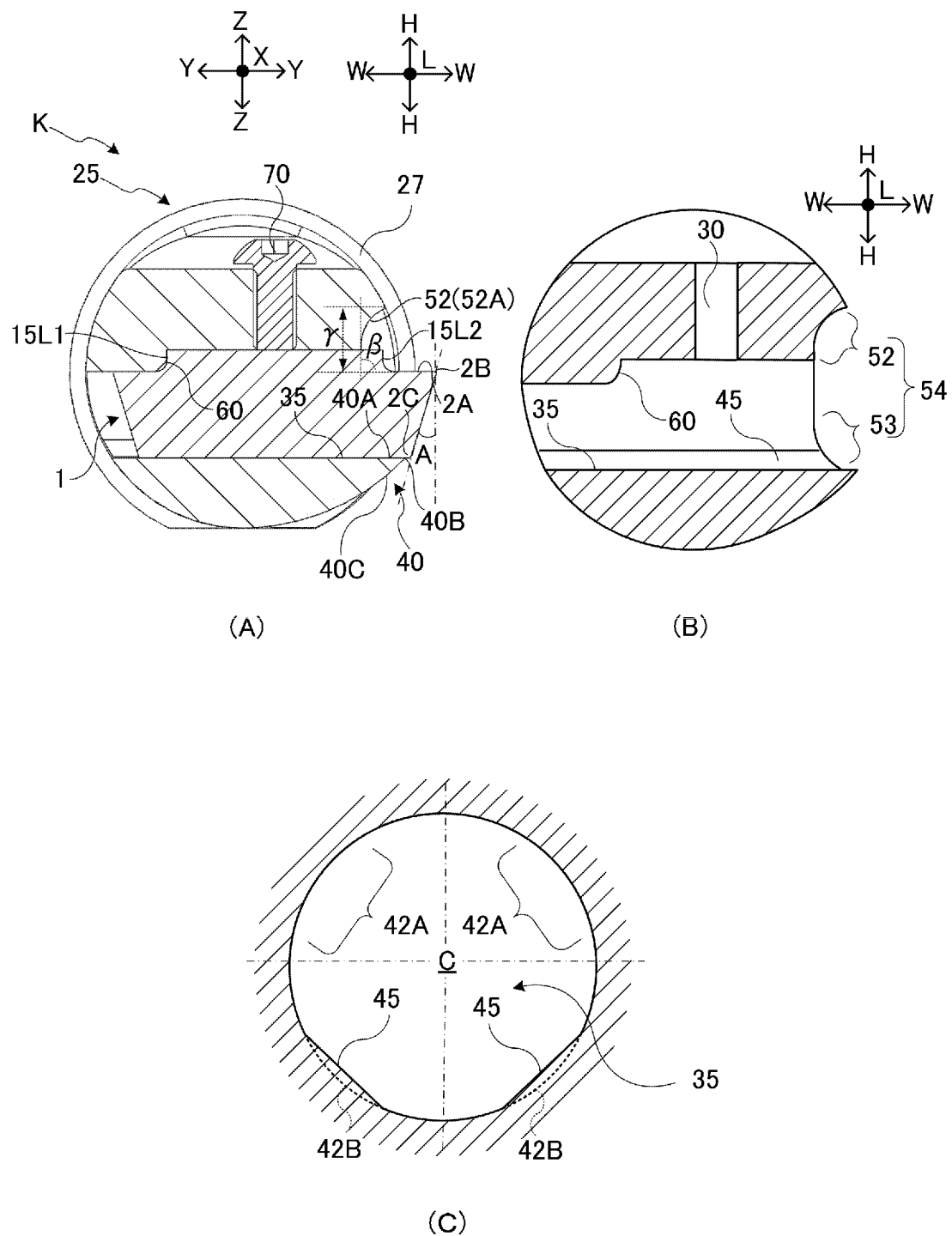
FIG. 4, Panel (A), is a cross-sectional view taken along a line A-A of FIG. 2, Panel (A), FIG. 4, Panel (B), is a cross-sectional view taken along the line A-A while a tip is omitted, and FIG. 4, Panel (C), is an enlarged cross-sectional view illustrating a tip-receiving hole.

As shown in FIG. 4, Panel (A), the lower jaw portion 40 is continuous from the bottom face of the tip-receiving hole 35 in an axial direction of the hole and protrudes further in the transverse direction W from the shank portion 27. As a result, a support face 40A of the lower jaw portion 40 is continuous to the bottom face of the tip-receiving hole 35 and protrudes outward from a side wall of the tip holder 25 in the transverse direction W. As a result, a protruding end 40B of the lower jaw portion 40 supports a lower portion 2C of the tool edge 2B protruding from the tip-receiving hole 35. This support structure may suppress a bias of the tip 1 caused by a main force being a vertically downward force of a cutting resistance.

As shown in FIG. 4, Panel (C), when assuming that the tip 1 is inserted into the tip-receiving hole 35, a partial cylindrical region 42A is formed on an inner circumferential surface, positioned on both sides of the transverse direction X of the virtual cutting face (which matches the longitudinal direction L of the main body), of the tip 1. A center of curvature of the partial cylindrical region 42A matches a virtual central axis C of the tip-receiving hole 35. One pair of rake faces 45 extending parallel to the virtual central axis C of the tip-receiving hole 35 is formed on an inner circumferential surface, positioned on at least one of both sides of the relative cutting direction H, of the tip-receiving hole 35. The one pair of rake faces 45 are formed on a radially inner side than a partial circular arc trajectory 42B on the extension line of the partial cylindrical region 42A in a cross-section orthogonal to the virtual central axis C of the partial cylindrical region 42A formed on an inner circumference of the tip-receiving hole 35. The rake faces 45 are symmetrically formed with respect to the virtual central axis C of the tip-receiving hole 35, and centers of curvature of the one pair of partial cylindrical regions 42A match the virtual central axis C. Further, the tip holder 25 includes the bolt hole 30 penetrating through the tip-receiving hole 35 from an outer circumferential surface of the shank portion 27, at a position opposing the rake faces 45 of the tip-receiving hole 35. A fastening screw 70 is screwed into the bolt hole 30 from an outside so as to protrude into the tip-receiving hole 35, whereby the tip 1 is fastened and fixed thereto (refer to FIG. 4, Panel (A)).

As shown in FIG. 4, Panel (A), although an outer circumferential contour of a cross-section perpendicular to an axis of the shank portion 27 of the tip holder 25 is substantially circular, the lower jaw portion 40 protrudes toward a radially outer side with respect to the outer circumferential surface. The lower jaw portion 40 supports the lower portion 2C of the tool edge 2B of the tip 1 protruding from the same outer circumferential surface in a moving direction of the tool edge 2B with respect to the workpiece. The tip 1 is received in the tip-receiving hole 35, and the positioning face 15L1 of the tip 1 contacts the positioning face 60 in the tip-receiving hole 35, whereby the longitudinal direction Y of the tip 1 is positioned accurately. Further, the bolt hole 30 is provided near the end portion of an axial direction of the shank portion 27. A cross-sectional view taken along a line C-C of FIG. 4, Panel (A), is illustrated in FIG. 4, Panel (C). The holder side positioning face 60 is installed in the tip-receiving hole 35. The holder side positioning face 60 contacts the positioning face 15L1 or 15L2 of the tip 1 inserted into the tip-receiving hole 35, whereby the tool edge 2B of the tip 1 is positioned in the longitudinal direction Y of the tip 1.

Referring back to FIG. 1, a chip-guiding wall 52 is formed on an outer circumferential surface of the shank portion 27 of the tip holder 25. The chip-guiding wall 52 starts near the tip-receiving hole 35 (or the tool edge 2B of the tip 1) and is formed to extend in a direction away from the tool edge 2B (in the present embodiment, a base end direction of the shank portion 27, that is, the longitudinal direction L of the shank portion 27). Thus, a longitudinal direction of the chip-guiding wall 52 corresponds to a direction substantially perpendicular to a protruding direction of the tool edge 2B (the longitudinal direction L of the shank portion 27 of tip holder 25). The chip-guiding wall 52 interferes with a chip generated by cutting with the tool edge 2B and guides the chip in the direction away from the tool edge 2B (in the present embodiment, the base end direction of the shank portion 27).

Further, the chip-guiding wall 52 includes substantially the same position as the tool edge 2B with respect to a relative feeding direction of the external workpiece and the tool edge 2B (herein, the longitudinal direction L of the shank portion 27) and has a tool edge side erect face 52A installed erect with respect to the cutting face 2A of the tool edge 2B. Thus, the chip generated by the tool edge 2B is immediately interfered with the tool edge side erect face 52A and curved. Further, an erection angle β of the tool edge side erect face 52A with respect to the cutting face 2A (refer to FIG. 4, Panel (A)) is desirably 120° or less, more desirably, 100° or less, most desirably, 90° or less. Further, a height γ of the tool edge side erect face 52A with respect to the cutting face 2A is set to 2 mm or more, desirably 4 mm or more, such that the chip may be curved quickly and smoothly.

As shown in FIG. 4, Panels (A) and (B), the chip-guiding wall 52 has a concave curved surface when viewed in the cross-section, thereby opposing the cutting direction (an upward direction in FIG. 4) of the tool edge 2B in the relative cutting direction H and becoming a rake face suitable for the tool edge 2B side (that is, the external workpiece side in the transverse direction W). As a result, as shown in FIG. 6, Panel (A), the chip-guiding wall 52 contacts the chip generated by the tool edge 2B to push the chip back toward the tool edge 2B side (the workpiece side) and further repeatedly curve the chip to a side (the cutting face 2A side) opposite to the cutting direction (the upward direction of FIG. 4), thereby actively curling the chip. As a result, the chip is in a coil state (a roll state; a helical state) so as not to be easily divided in the meantime.

Further, as shown in FIG. 4, Panel (B), the chip-guiding wall 52 is formed by one side wall of a groove portion 54 formed in a concave shape on the outer circumferential surface of the shank portion 27 such that an auxiliary guiding wall 53 is also formed on the other side wall of the groove portion 54. The auxiliary guiding wall 53 further guides the chip in the coil state by the chip-guiding wall 52 in a direction in which the number of windings of the coil increases. In this manner, the coil-shaped chip is not curved in a direction opposite to the winding direction, whereby a fracture of the chip is suppressed.

Figure 2:
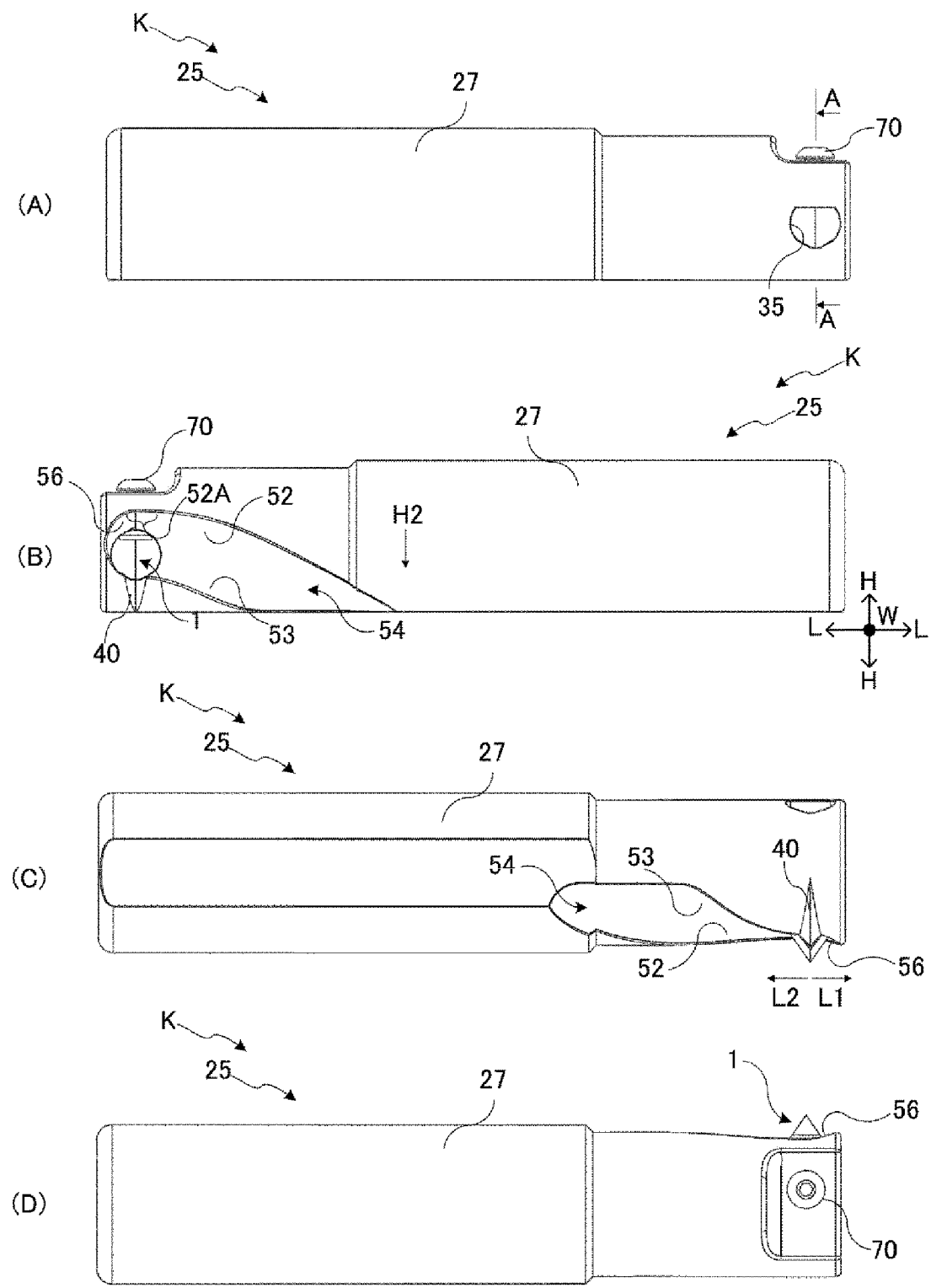
FIG. 2, Panels (A) through (D), are a left side view, a right side view, a bottom view, and a top view of the cutting tool, respectively.
Figure 3:
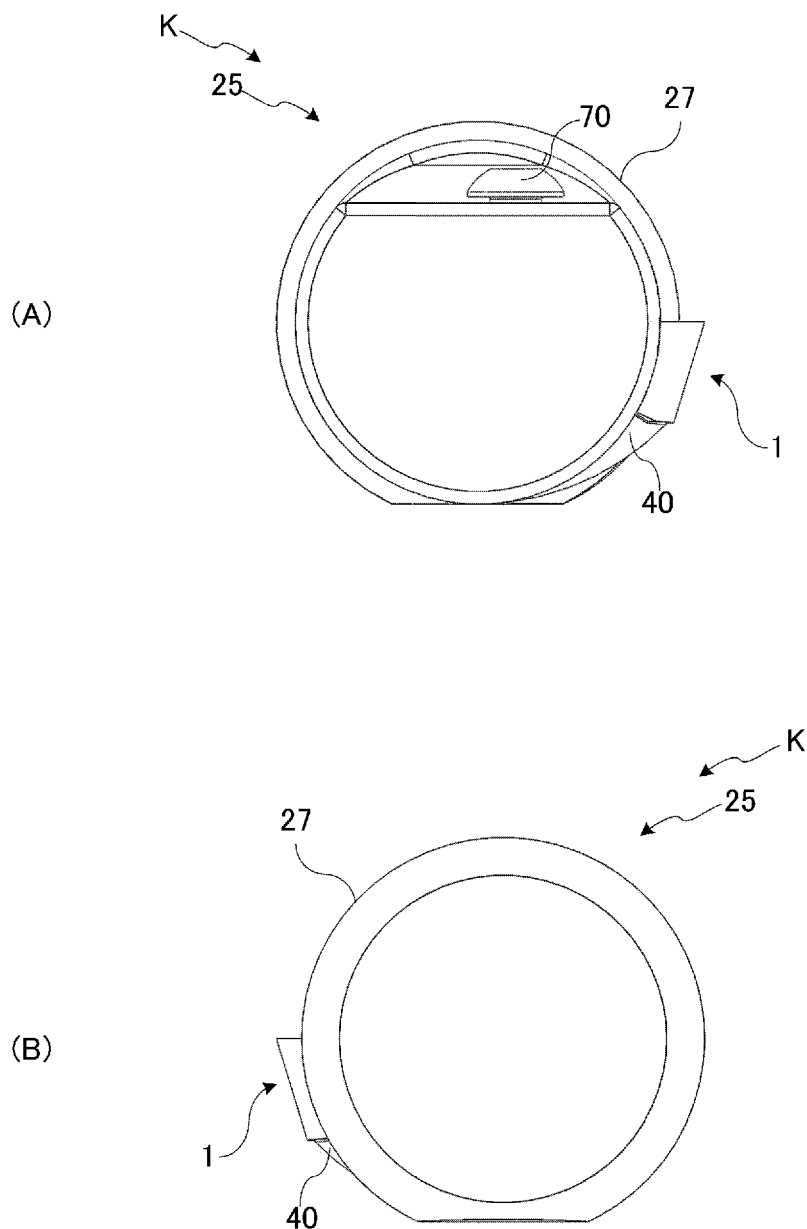
FIG. 3, Panels (A) and (B), are a front view and a rear view of the cutting tool, respectively.

Further, as shown in FIG. 2, Panels (B) and (C), the chip-guiding wall 52 spirally extends in an outer circumferential direction of the shank portion 27. However, the chip-guiding wall 52 is not necessarily supposed to spirally extend in the outer circumferential direction of the shank portion 27. The chip-guiding wall 52 may extend from a tip end side of the cutting tool K in which the tool edge 2B is disposed toward a base end side being the shank portion 27 side such that the chip cut from the external workpiece by the tool edge 2B is guided along the chip-guiding wall 52 from the tip end side toward the base end side. In detail, the chip-guiding wall 52, although not particularly limited, turns in a direction away from the tool edge 2B (the longitudinal direction L of the shank portion 27), also, in a direction opposite to the moving direction of the tool edge 2B with respect to the workpiece (an upward direction in FIG. 2, Panel (B), which is defined as a "cutting direction"; refer to an arrow indicator H2), in the relative cutting direction H of the tool edge 2B. Thus, as shown in FIG. 6, Panels (B) and (C), a rotational direction (the winding direction) J of the coil-shaped chip in the coil state matches a direction T in which the chip is turned in the circumferential direction by the chip-guiding wall 52, such that the chip is not easily divided in the middle of discharging and is discharged smoothly along the chip-guiding wall 52.

As shown in FIG. 4, Panels (C) and (D), a discharge direction restricting face 56 is formed on the outer circumferential surface of the shank portion 27 of the tip holder 25. The discharge direction restricting face 56 is formed near the tool edge 2B and contacts the relative feeding direction of the external workpiece and the tool edge 2B (here, the longitudinal direction L of the shank portion 27). In detail, the discharge direction restricting face 56 is disposed on a forward side (refer to an arrow indicator L1) of the tool edge 2B in the relative feeding direction and contacts a backward direction (an arrow indicator L1 side) of the tool edge in the relative feeding direction, with respect to the tool edge 2B.

The discharge direction restricting face 56 is formed by an end face of the longitudinal direction of the groove portion 54 described above and, thus, is continuous with the end portion of the chip-guiding wall 52 (the tool edge side erect face 52A). As a result, a chip-collecting space near the tool edge 2B is in a dead-end state in the relative feeding direction. Thus, as shown in FIG. 6, Panel (B), the chip generated by the tool edge 2B may not proceed by interfering with the discharge direction restricting face 56 although the chip is to proceed toward the tip end side of the shank portion 27 (refer to an arrow indicator L1) such that a discharging direction of the chip is limited to one direction (the direction of the arrow indicator L2) by the discharge direction restricting face 56, and the chip is discharged to the base end side along the chip-guiding wall 52.

Further, as shown in FIG. 4, Panel (A), a relief angle of a ridge 40C of the lower jaw portion 40 at the tip end portion of the tip holder 25 is set to be greater than the end relief angle A of the tool edge 2B of the tip 1 but may also be equal thereto. The relief angle of the lower jaw portion 40 is desirably set not to interfere with the external workpiece, and since the lower jaw portion 40 is likely to interfere with the external workpiece, particularly during inner diameter machining, the relief angle is set to be relatively great.

Further, in the present embodiment, as shown in FIG. 4, Panel (A), the positioning face 15L1 of the tip 1 contacts the holder side positioning face 60 in the tip-receiving hole 35, whereby the protruding direction of the tool edge of the tip 1 is positioned accurately. That is, the holder side positioning face 60 may prevent a deviation in a direction opposite to the workpiece in an axial direction S of the tip-receiving hole of the tip 1 caused by a backward force of a cutting resistance. In addition, the rake faces 45 of the tip holder 25 and the rake face 4 of the tip 1 contact each other by the fastening screw 70, whereby a positioning accuracy of the transverse direction X of the tool edge 2B may improve.

Further, as shown in FIG. 9, Panel (A), in a state in which the tip 1 is received in the tip-receiving hole 35 of the tip holder 25, a fastening state of the fastening screw 70 is released, and a flank under the cutting section 2L1, 2L2 on a side not being cut (a side opposite to the lower jaw portion 40) is pressed on the lower jaw portion 40 side. As a result, the tip 1 is pushed out in a direction of the arrow indicator of FIG. 9, Panel (B) and taken out from the tip-receiving hole 35 as shown in FIG. 9, Panel (C). Further, in the present embodiment, an exclusive pushing hole for the tip 1 is not installed in the tip holder 25. However, an exclusive pushing hole may be installed so as not to penetrate through the tip-receiving hole 35, and the tip 1 may be pushed out using a pushing bar (not shown). In doing so, an inconvenience that the chip enters from an opening portion, rather than a cutting side of a through-hole of the tip-receiving hole 35, is alleviated.

Next, a modified example of the cutting tool K will be described with reference to FIGS. 10 through 12. Further, the same or similar components or members will be provided with the same reference numeral, whereby a repeated description related thereto will be omitted and differences therebetween will be described.

Figure 10:
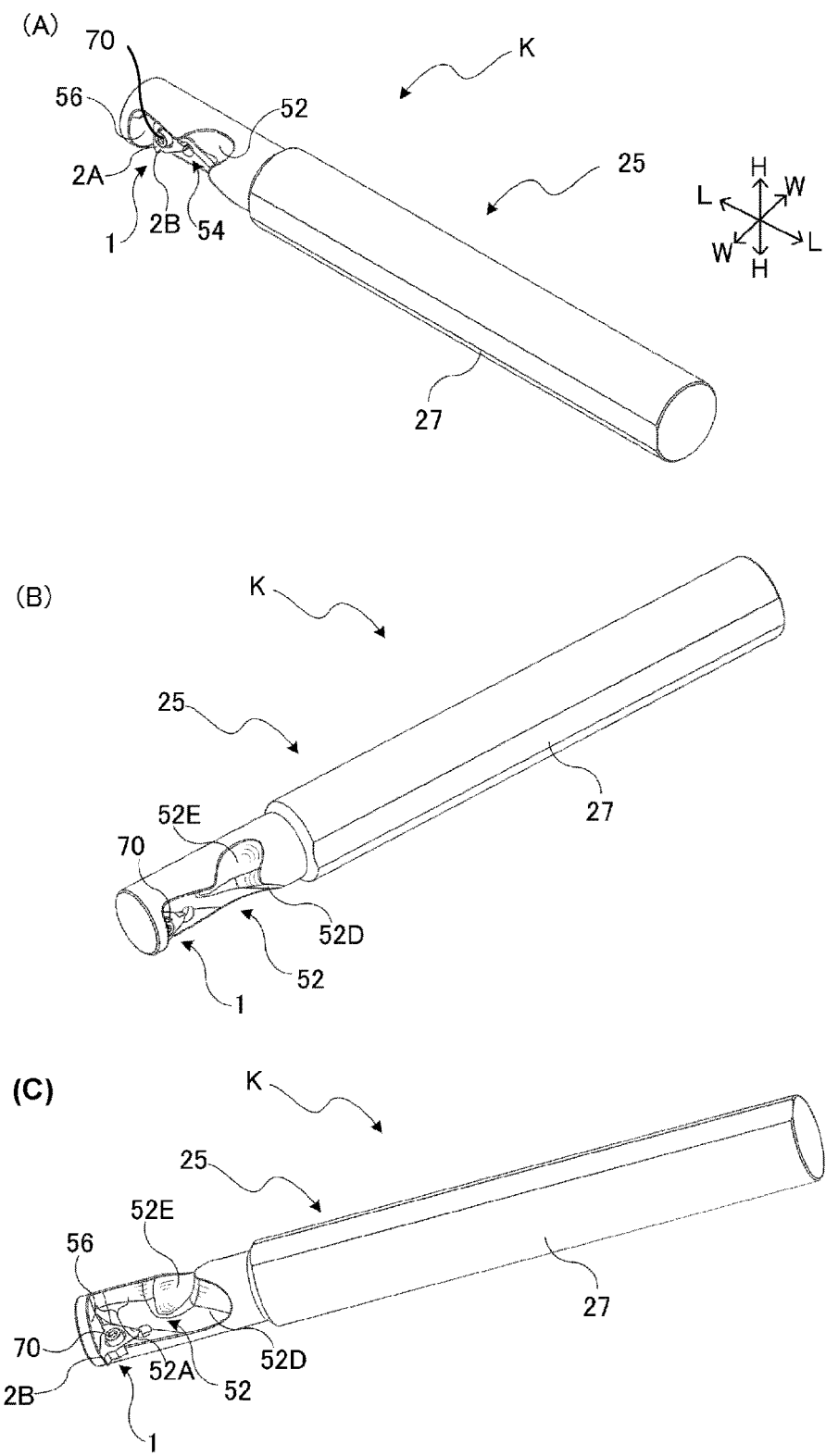
FIG. 10, Panels (A) through (C), are perspective diagrams illustrating a cutting tool according to a modified embodiment.

As shown in FIG. 10, the cutting tool K includes the cutting tip 1 for internal diameter female threading, the cutting tip 1 provided in a triangular shape having a tool edge on each vertex, and the tip holder 25.

The chip-guiding wall 52 is formed on an outer circumferential surface of the shank portion 27 of the tip holder 25. The chip-guiding wall 52 starts near the tool edge 2B of the tip 1 and is formed to extend in a direction away from the tool edge 2B (in the present embodiment, a base end direction of the shank portion 27, that is, the longitudinal direction L of the shank portion 27). The chip-guiding wall 52 includes substantially the same position as the tool edge 2B with respect to a relative feeding direction of the external workpiece and the tool edge 2B (here, the longitudinal direction L of the shank portion 27) and has the tool edge side erect face 52A installed erect with respect to the cutting face 2A of the tool edge 2B.

Figure 11:
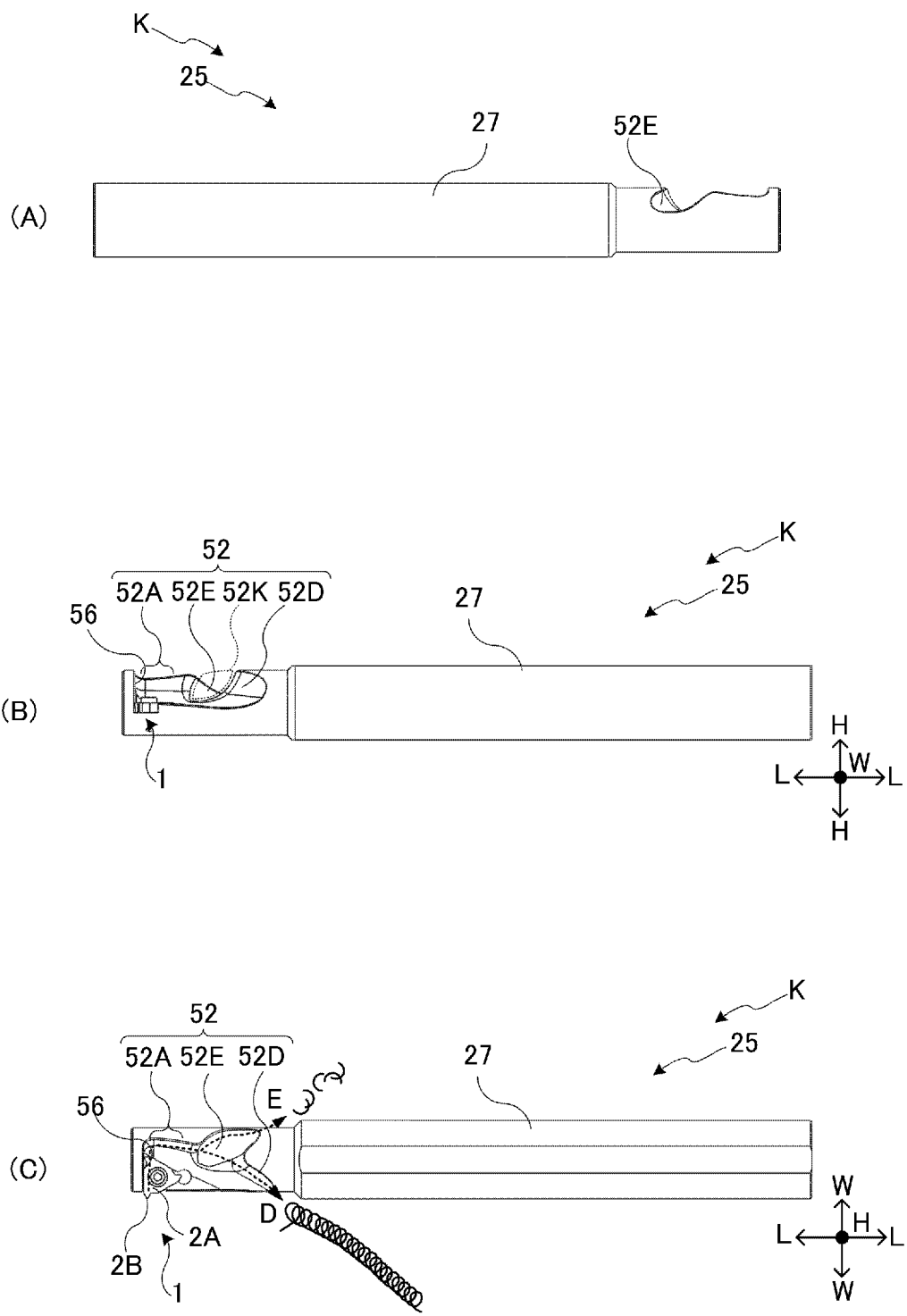
FIG. 11, Panels (A) through (C), are a left side view, a right side view, and a top view of the cutting tool, respectively.

As shown in FIG. 11, Panel (C), the tool edge side erect face 52A is substantially perpendicular to the cutting face 2A. Further, as shown in FIG. 11, Panel (B), the chip-guiding wall 52 branches into a first guiding wall piece 52D and a second guiding wall piece 52E in the middle of extending in the direction away from the tool edge 2B. In detail, the second guiding wall piece 52E is continuous with the tool edge side erect contact face 52A in a wall longitudinal direction and is formed to curve at a branching position in a direction in which the wall escapes (a retreating direction; an upward direction in FIG. 11, Panel (B)). Meanwhile, the first guiding wall piece 52D is formed at a position away from the tool edge 2B while an opening portion 52K formed at the branching position, at which a wall partially vanishes, is interposed.

As a result, as shown in FIG. 11, Panel (C), a portion of chips guided by the discharge direction restricting face 56 and the tool edge side erect contact face 52A in the direction away from the tool edge 2B is discharged from the opening portion 52K via the second guiding wall piece 52E (refer to an arrow indicator E), and a remaining portion thereof is discharged via the first guiding wall piece 52D without entering the opening portion 52K (refer to an arrow indicator D). As a result, a large quantity of chips may be effectively discharged. The first guiding wall piece 52D discharges chips in the coil state, and fine chip pieces divided in the meantime enter the opening portion 52K and are discharged via the second guiding wall piece 52E. As a result, the fine chip pieces do not stay in the middle of the chip-guiding wall 52, and thus stable cutting may be implemented at all times.

Further, in the cutting tool K shown in FIGS. 10 through 12, an example in which the tool edge side erect face 52A and the second guiding wall piece 52E in which the opening portion 52K is interposed are substantially continuous in an extending direction (a spiral direction) is illustrated. However, embodiments are not limited thereto.

Figure 13:
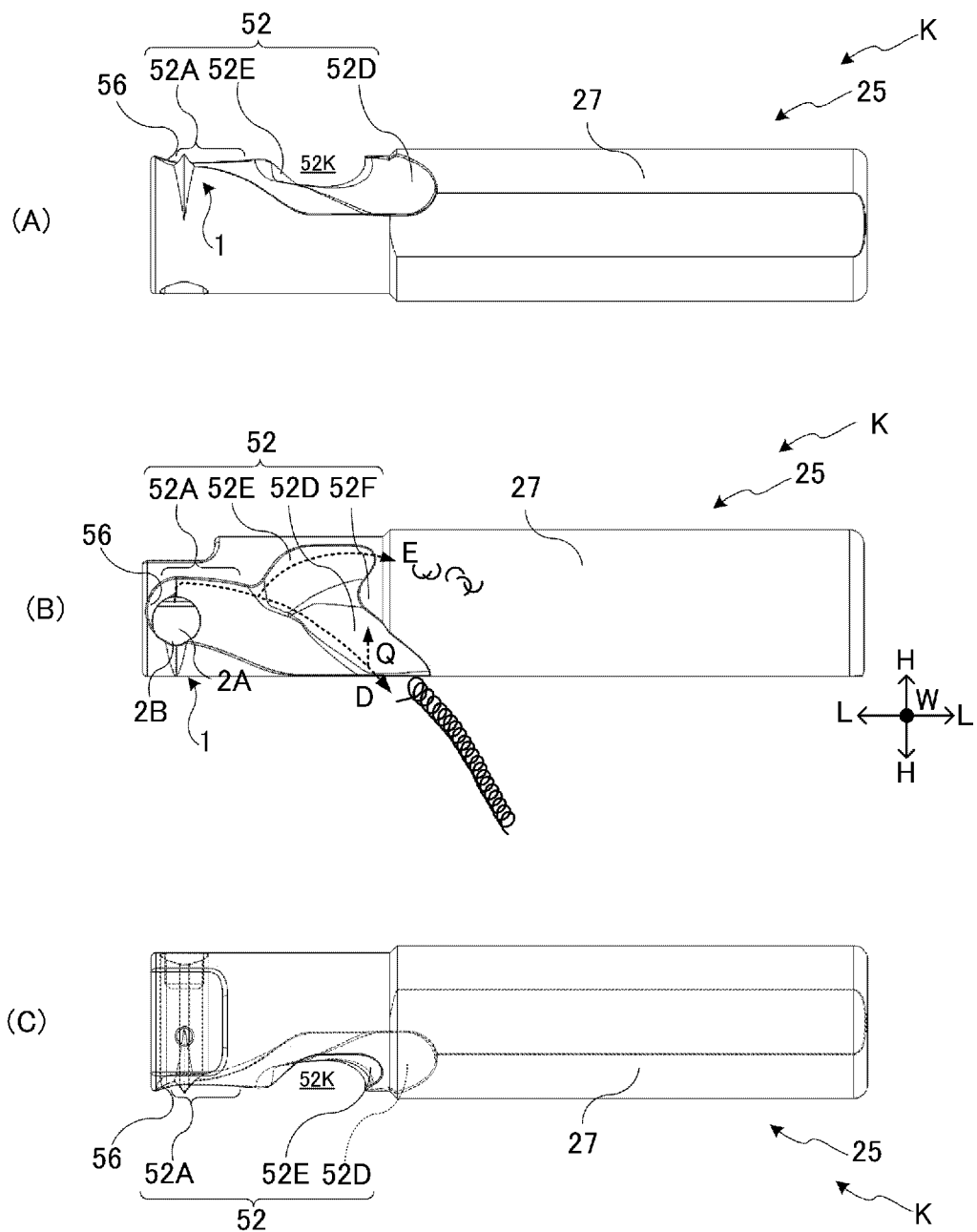
FIG. 13, Panels (A) through (C), are a top view, a right side view, and a bottom view illustrating a cutting tool according to a modified embodiment, respectively.

For example, as in the cutting tool K of FIG. 13, the tool edge side erect face 52A and the second guiding wall piece 52E in which the opening portion 52K is interposed may be installed to be positionally deviated. In detail, when compared to the tool edge side erect face 52A, the second guiding wall piece 52E is positioned on a retreating side with respect to a direction in which each face faces. In other words, the first guiding wall piece 52D offsets toward an opposite spiral direction side (refer to an arrow indicator Q) than the tool edge side erect face 52A, with respect to the spiral direction of the chip-guiding wall 52 (refer to an arrow indicator D). In doing so, a situation in which protruding ends of the chips in the coil state guided by the tool edge side erect face 52A collide with a branch root portion 52F and are guided to the first guiding wall piece 52D may be suppressed. As a result, the second guiding wall piece 52E side mainly discharges fine chips, and relatively long chips may be discharged smoothly from the first guiding wall piece 52D side.

Figure 14:
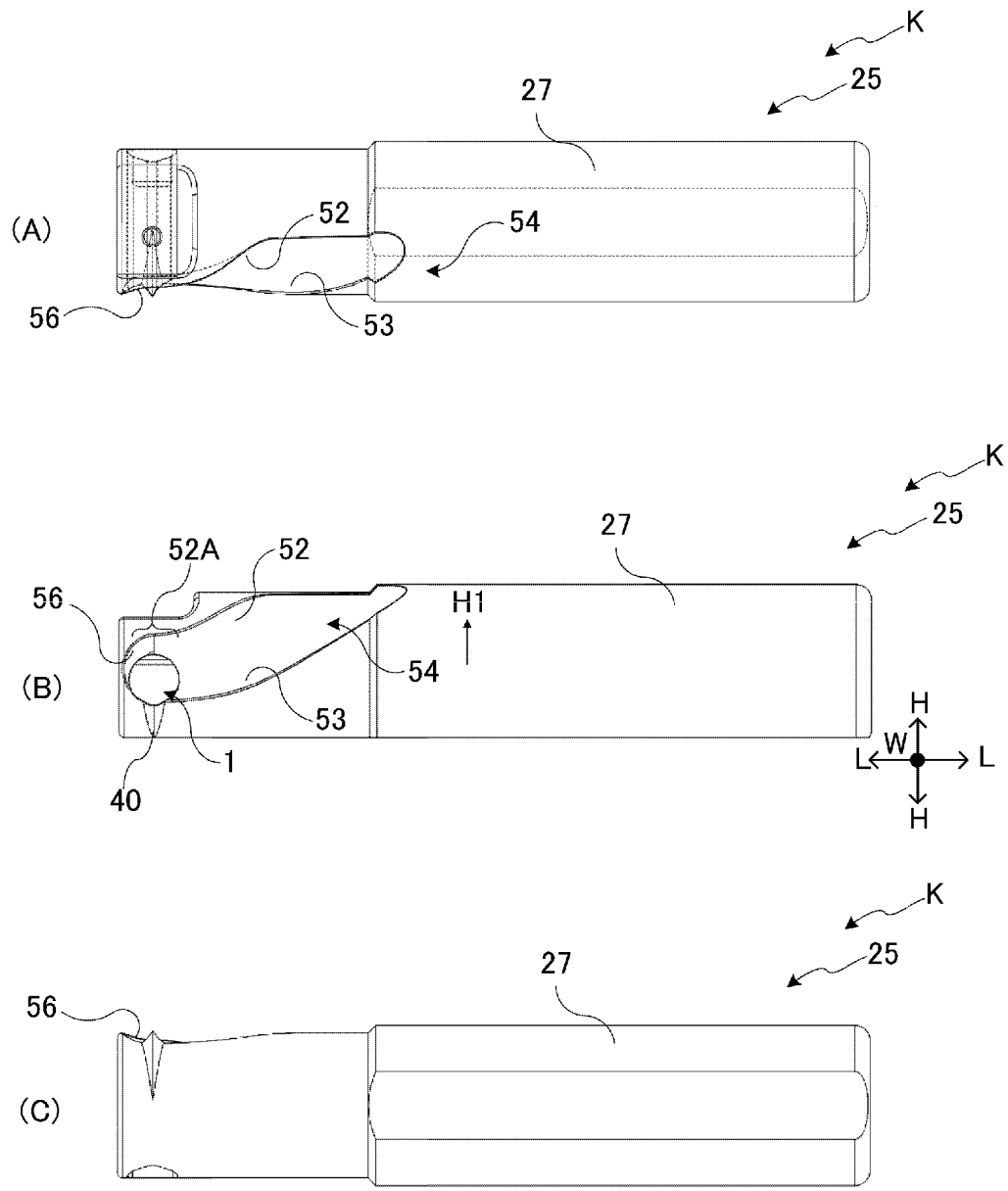
FIG. 14, Panels (A) through (C), are a top view, a right side view, and a bottom view illustrating a cutting tool according to a modified embodiment, respectively.

Further, in the cutting tool K of FIG. 2 and the like, an example in which the chip-guiding wall 52 turns in a direction opposite to the moving direction of the tool edge 2B (the upward direction in FIG. 2, Panel (B)) with respect to the workpiece in the relative cutting direction H of the tool edge 2B is illustrated. However, as shown in FIG. 14, the chip-guiding wall 52 may also turn in the moving direction of the tool edge 2B (an upward direction in FIG. 14; refer to an arrow indicator H1) with respect to the workpiece. Even in this way, the chips may be discharged smoothly.

Figure 15:
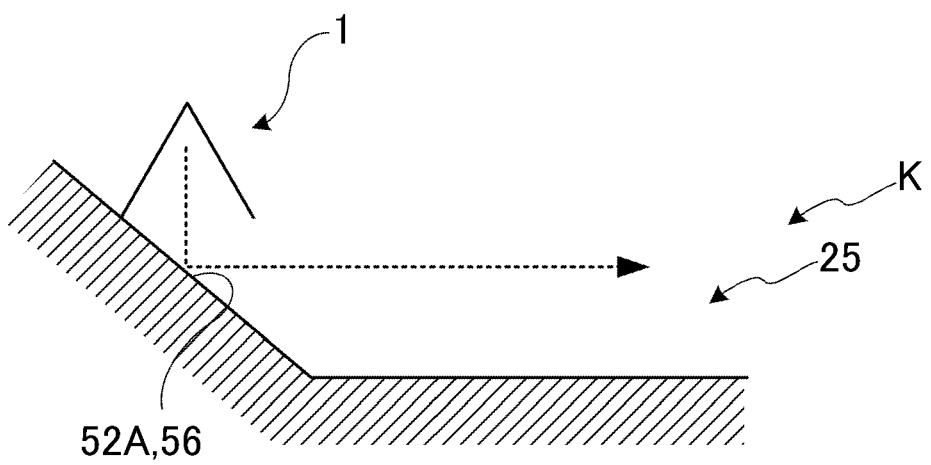
FIG. 15 is an enlarged diagram illustrating a tool edge of a tip of a cutting tool according to a modified embodiment.

Further, although not particularly shown, in an example in which the discharge direction restricting face 56 and the tool edge side erect face 52A are continuous, a boundary between the discharge direction restricting face 56 and the tool edge side erect face 52A does not need to be clear. For example, as shown in FIG. 15, a rake face inclined with respect to the longitudinal direction of the tip holder 25 may be formed near the tool edge of the tip 1, and the rake face may also serve as the discharge direction restricting face 56 and the tool edge side erect face 52A.

Next, as an example of a workpiece to be processed by the cutting tool according to the present embodiment, an example of using a so-called male threaded body such as a bolt and a so-called female threaded body such as a nut will be introduced.

In relation to a fastening structure using the threaded bodies, there is an example in which two types of spiral grooves (for example, a right-handed male threaded portion and a left-handed male threaded portion) having different lead angles and/or lead directions are formed for a single male threaded body, and two types of female threaded bodies (for example, a right-handed female threaded portion and a left-handed female threaded portion) are screwed with the two types of the spiral grooves, respectively, like a double nut. By restricting a relative rotation of the two types of the female threaded bodies using an engaging device, an axial interference action or an axial separation and returning action by the different lead angles and/or lead directions may prevent mechanical loosening with the male threaded body.

FIG. 16, Panel (A), illustrates a compound screw, wherein two types of spiral grooves (a right-handed male threaded portion and a left-handed male threaded portion) having different lead directions are formed for a single male threaded body.

A male threaded body 140 includes a male threaded portion 153 installed from a base side toward a shaft end, the male threaded portion 153 having a male-screw spiral structure. In this example, two types of male-screw spiral structures, for example, a first male-screw spiral structure 154 being a right-handed screw configured to screw a spiral section of a female-screw shape serving as a corresponding right-handed screw, and a second male-screw spiral structure 155 being a left-handed screw configured to screw a spiral section of a female-screw shape serving as a corresponding left-handed screw, are formed repeatedly on the same region of the male threaded portion 153. As shown in FIG. 16, Panel (B), an approximately crescentic thread 153a extending in a circumferential direction with respect to a planar direction perpendicular to a center of axis (screw axis) C is installed alternately on one side (the left side of the figure) and another side (the right side of the figure) of the male threaded portion 153. By configuring the thread 153a as described above, two types of spiral grooves having a spiral structure to circle clockwise and a spiral structure to circle counterclockwise may be formed between the threads 153a.

In doing so, the two types of male-screw spiral structures such as the first male-screw spiral structure 154 and the second male-screw spiral structure 155 are formed in the male threaded body 140. Thus, the male threaded body 140 may be screwed with any female threaded body of the right-handed screw and the left-handed screw.

To implement a loosening-free fastening structure with a practical strength using such a double spiral structure (a compound screw), a special thread having a substantially elliptical cross-section perpendicular to an axis, disclosed in Japanese Patent No. 4663813, which is a result of research by the inventor of the present application, is effective (refer to FIG. 16, Panel (B)).

Further, the above embodiment illustrates an example in which the tip 1 and the tip holder 25 are provided separate from each other, and the vicinity of the tool edge section 2L1, 2L2 of the tip 1 is held by a peripheral member of the tip-receiving hole 35 of the tip holder 25. Thus, "the base section configured to hold the cutting section" recited in the claims is a concept including the peripheral member of the tip-receiving hole 35 of the tip holder 25 and extending to the shank portion 27, in the present embodiment. However, the scope of the base section is not particularly limited thereto. This also applies to a tool bit including the tip 1 and the tip holder 25 as one piece.

An example in which the cutting section 2L1, 2L2 of the cutting tip 1 is symmetrically provided with respect to a reference line extending in the longitudinal direction Y of the tip main body when viewed from the relative cutting direction Z of FIG. 8, Panel (A), as described above, that is, includes two main cutting edges 2D1 and 2D2 that are symmetric when viewed from the tool edge 2B, is desirable for a case in which cutting is performed on a screw by reversing only a feeding direction to form two spiral sections having different lead directions. In detail, the above shape enables radial-in-feed finishing. However, an infeed method is not limited to a radial infeed, and thus angles of the two main cutting edges may not necessarily be the same.

Examples of the cutting tool are described above. However, embodiments are not limited thereto, and various modifications may be made thereto within the scope of the claims. For example, although FIG. 1 illustrates an example in which the tip-receiving hole 35 is installed to penetrate in the transverse direction W of the tip holder 25 with respect to the main body of the tip holder 25, the tip-receiving hole 35 may also be formed or inclined on an end face of the longitudinal direction L of the tip holder 25 in the same longitudinal direction L.

Next, an angle of the tool edge 2B of the cutting tip 1 applied to cut a threaded body will be described. Since the angle of the tool edge 2B is determined by a thread angle of the threaded body, the thread angle of the treaded body will be described here.

<Male Threaded Body and Female Threaded Body>

Referring to FIGS. 17 and 18, a fastening structure 102 of a male threaded body 10 and a female threaded body 100 being workpieces is implemented by screwing the female threaded body 100 to the male threaded body 10.

Figure 20:
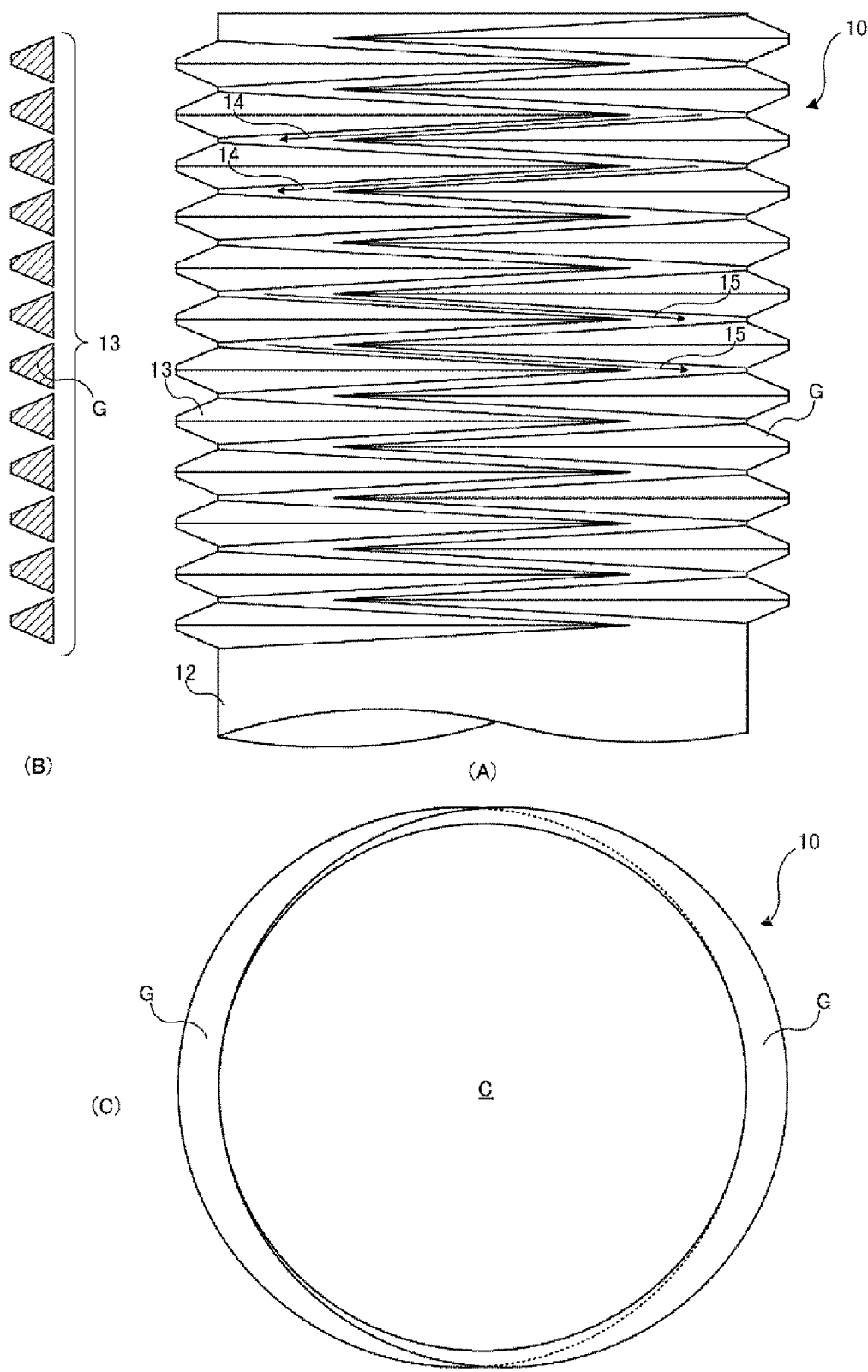
FIG. 20, Panel (A), is a front view illustrating the male threaded body, Panel (B) is a cross-sectional view illustrating threads only, and Panel (C) is a plan view illustrating the male threaded body.
Figure 21:
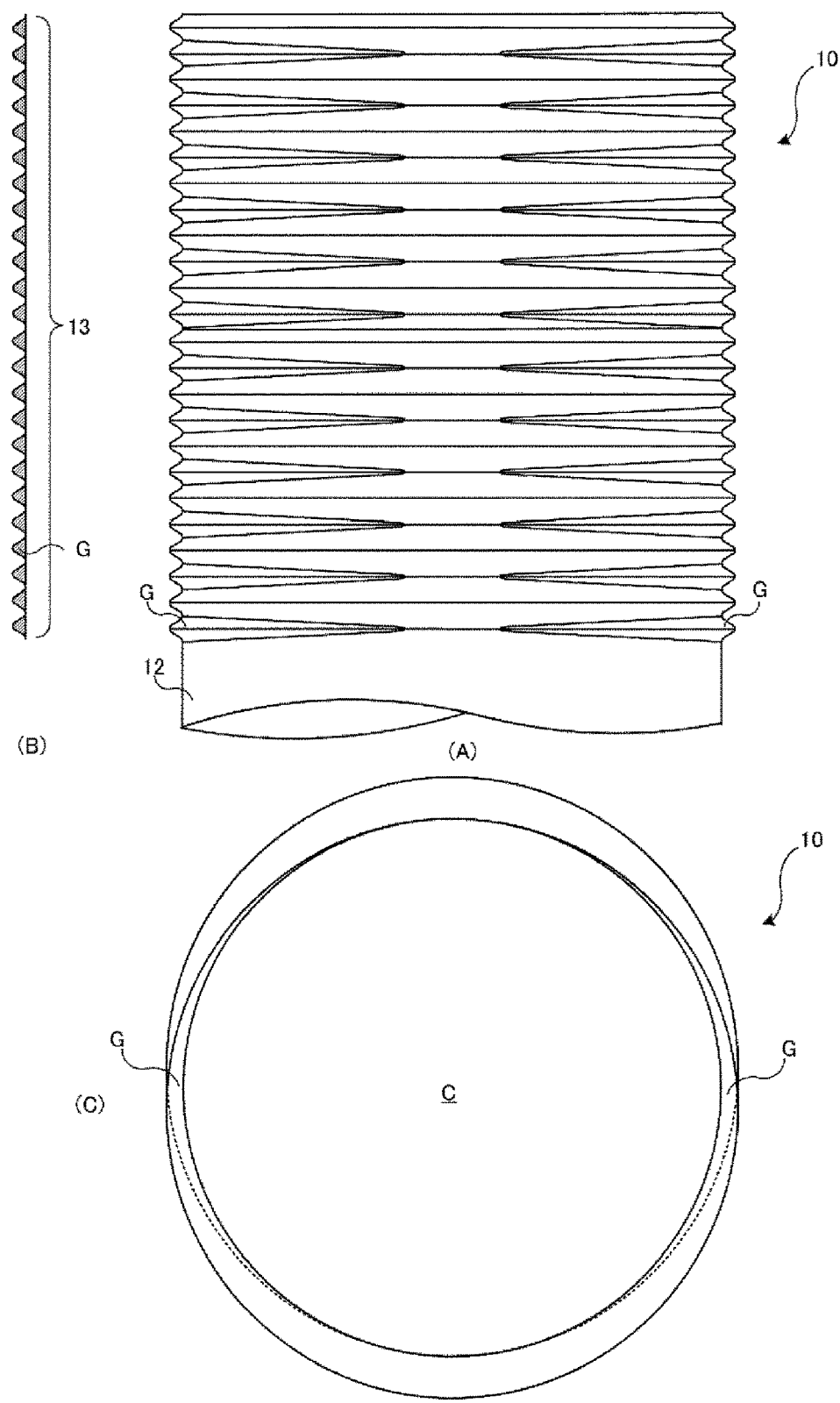
FIG. 21, Panel (A), is a side view illustrating the male threaded body, Panel (B) is a cross-sectional view illustrating threads only, and Panel (C) is a plan view illustrating the male threaded body.

Referring to FIGS. 20 and 21, in the male threaded body 10, a base portion of a shaft portion 12 is present toward an axial end and a male threaded portion 13 on which a male threaded spiral groove is formed is provided. In the present embodiment, two types of male threaded spiral grooves of a first spiral groove 14 configured as a right screw that enables screwing of a female screw-shaped spiral strip including a corresponding right screw and a second spiral groove 15 configured as a left screw that enables screwing of a female screw-shaped spiral strip including a corresponding left screw, with respect to the male threaded portion 13, are formed to overlap on the same region in an axial direction of the male threaded body 10. Also, in addition to the overlapping portion, a single spiral groove region on which a spiral groove is formed in one direction may be provided.

The first spiral groove 14 may screw with a female screw-shaped spiral strip including a corresponding right screw of the female threaded body 100, and the second spiral groove 15 may screw with a female screw-shaped spiral strip including a corresponding left screw of the female threaded body 100) (including a body separate from the female threaded body including the right screw).

Referring to FIG. 20, Panel (C), and FIG. 21, Panel (C), in the male threaded portion 13, an approximately crescent-shaped thread G that extends in a circumferential direction relative to a plane direction perpendicular to an axial center (screw axis) C is alternatively provided to one side (left side in figures) and another side (right side in figures) in a diametrical direction of the male threaded portion 13. That is, a ridge line of the thread G extends perpendicularly relative to an axis and a height of the thread G changes to have a high center in the circumferential direction and gradually decreasing ends in the circumferential direction. By configuring the thread G as above, two types of spiral grooves of a virtual spiral groove structure (refer to an arrow indicator for first spiral groove 14 of FIG. 20, Panel (A)) that turns clockwise and a virtual spiral groove structure (refer to an arrow indicator of second spiral groove 15 of FIG. 20, Panel (A)) that turns counterclockwise may be formed between the threads G.

In the present embodiment, in this manner, the two types of male threaded spiral grooves of the first spiral groove 14 and the second spiral groove 15 are superimposed on the male threaded portion 13. Accordingly, the male threaded portion 13 may screw with any female threaded body of the right screw and the left screw. Also, the details of the male threaded portion 13 in which two types of male threaded spiral grooves are formed may refer to Japanese Patent Registration No. 4663813 of Michiwaki, the inventor of the present application.

Referring to FIG. 19, Panel (A), the female threaded body 100 includes a cylindrical member 106. The cylindrical member 106 is in a so-called hexagonal nut shape and has a through-hole portion 106a in its center. An approximate shape of the female threaded body 100 is not limited to the hexagonal nut shape and may be arbitrarily set in, for example, a cylindrical shape, a shape having a knurling tool on the circumferential surface, a quadrangular shape, a star shape, and the like. A first female threaded spiral strip 114 as the right screw is formed in the through-hole portion 106a. That is, the first female threaded spiral strip 114 of the cylindrical member 106 engages with the first spiral groove 14 in the male threaded portion 13 of the male threaded body 10.

Also, referring to FIG. 19, Panel (B), in the female threaded body 101, a second female threaded spiral strip 115 as the left screw may be formed in the through-hole portion 106a. In this case, the second female threaded spiral strip 115 engages with the second spiral groove 15 in the male threaded portion 13 of the male threaded body 10.

Hereinafter, a shape of a cross-section of the thread G formed in the male threaded portion 13 of the male threaded body 10 and cut along an axial direction and viewed in an axial-orthogonal direction will be described with reference to FIG. 22, Panel (A).

Also, referring to FIG. 22, Panel (B), a shape of a thread P of the first female threaded spiral strip 114 of the female threaded body 100 and/or the second female threaded spiral strip 115 of the female threaded body 101 is relatively set based on the shape of the thread G of the male threaded body 10. Therefore, a further description is omitted here.

Also, in the present embodiment, N may be assigned as an initial letter with respect to a nominal diameter of the male threaded body 10. For example, the male threaded body 10 of N16 indicates that a diameter F is 16 mm from an apex Gt of the thread G. The female threaded body 100 of N16 indicates that a root diameter of the thread is 16 mm.

A thread angle T of the thread G (in which the thread angle indicates an angle formed by a single pair of inclined surfaces extending from the apex to a valley of the thread G) may be set to 61° or more or 75° or less, and desirably, may be set to 63° or more or 73° or less. More desirably, the thread angle T may be set to 65° or more or 73° or less, and more specifically, 70°. A root diameter D of the thread G (i.e., an outer diameter in a case in which the thread G is absent in the shaft portion 12 of the male threaded body 10) may be set to 13.5 mm or more or 14.3 mm or less in the case of N16. In the case of N16, the root diameter D may be set to 13.5 mm or more or 14.3 mm or less. In the case of N24, the root diameter D may be set to 19.6 mm or more or 20.5 mm or less. In the case of N30, the root diameter D may be set to 25.8 mm or more or 26.7 mm or less. The term "root diameter" used herein corresponds to a diameter of a bottom portion of the valley, not an effective diameter used in the conventional metric thread.

Accordingly, referring to FIG. 22, Panel (B), even with respect to the female threaded body 100, a thread angle Q of the thread P may be set to 61° or more or 75° or more, and, desirably, may be set to 63° or more or 73° or less. More desirably, the thread angle Q may be set to 65° or more or 73° or less, and more specifically, 70°. Also, a diameter E of an apex Pt of the thread P may be set to 13.5 mm or more or 14.3 mm or less in the case of N16. In the case of N16, the diameter E may be set to 13.5 mm or more or 14.3 mm or less. In the case of N24, the diameter E may be set to 19.6 mm or more or 20.5 mm or less. In the case of N30, the diameter E may be set to 25.8 mm or more or 26.7 mm or less. Also, the diameter of the female screw may be set to be equal to or greater than the root diameter of the male threaded body.

<Design Method and Design Basis>

Hereinafter, a design method and design basis of the male threaded body 10 and the female threaded body 100 will be described. Also, an example of designing the male threaded body 10 with nominal diameter N16 is introduced.

<Preparation of Series of the Male Threaded Body 10 and the Female Threaded Body 100>

Referring to FIG. 23, Panel (A), with respect to the male threaded body 10 with the nominal diameter N16, a plurality of male threaded bodies for verification 10 (Tn, Dn) is prepared to fill a portion or all of a matrix condition including a plurality of different root diameters D1, D2, . . . , Dn and a plurality of thread angles T1, T2, . . . , Tn.

Also, the same number of female threaded bodies for verification 100 as the number of the plurality of male threaded bodies for verification 10 (Tn, Dn) are prepared to correspond thereto and screw therewith, respectively. That is, referring to FIG. 23, Panel (B), a plurality of female threaded bodies for verification 100 (Qn, En) is prepared to fill a portion of or all of a matrix condition including a plurality of different diameters E1, E2, . . . , En and a plurality of different thread angles Q1, Q2, . . . , Qn. In detail, the diameter En of the female threaded body for verification 100 (Qn, En) approximately matches the root diameter Dn of the male threaded body for verification 10 (Tn, Dn), and the thread angle Qn approximately matches the thread angle Tn of the male threaded body for verification 10 (Tn, Dn). Accordingly, a plurality of verification sets each in which the male threaded body for verification 10 (Tn, Dn) and the female threaded body for verification 100 (Qn, En) present at the same location of the matrices of FIG. 23, Panels (A) and (B), are provided as a pair.

Also, an axial length W (referred to as a length W associated with the axial direction in FIG. 17) of the female threaded body for verification 100 (Qn, En) is a predetermined ratio γ (0<γ<1) for the nominal diameter N16 to be common to all the test specimens, in a fastening strength test using the nominal diameter N16. That is, in this example of N16, the axial length W of the female threaded body for verification 100 (Qn, En) is set to 16 mm×γ. A value of W is calculated by multiplying each nominal diameter by the ratio γ that is a unique material value.

Figure 24:
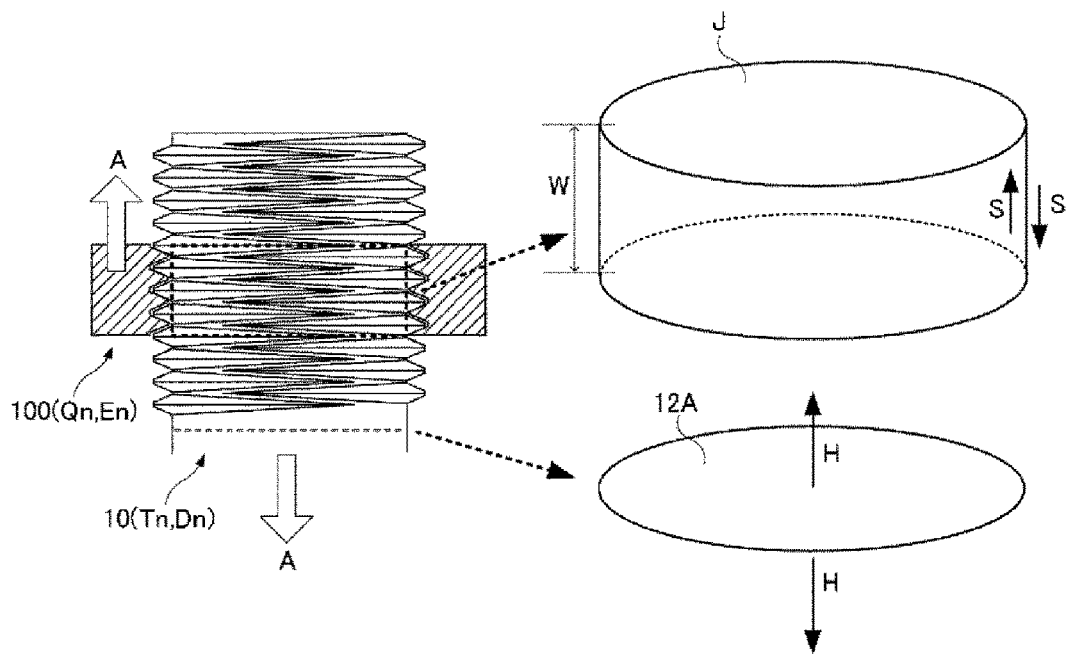
FIG. 24 is a view illustrating an aspect of a fastening strength test on the male threaded body for verification and the female threaded body for verification.

Referring to FIG. 24, the length W associated with the axial direction uses a value that is easily approximated by a tensile strength H that a cross-section 12A perpendicular to an axis of the shaft portion 12 of the male threaded body 10 may withstand and a shear strength S of a circumferential surface J that includes a base surface GL (refer to FIG. 22, Panels (A)) of the thread G of the male threaded body 10 in the length W associated with the axial direction. Here, the tensile strength H may be a value obtained by multiplying a cross-sectional area in the root diameter Dn by coefficient a1 and may be represented by H=π×Dn2×a1. The shear strength S may be a value obtained by multiplying a cylindrical area corresponding to the axial length W in the root diameter Dn by coefficient a2 and may be represented by S=π×Dn×W×a2.

The coefficient a1 or a2 may differ for each base material. According to review of the present inventor, in the present embodiment, when selecting a general-purpose steel material, for example, S45C or SCM435, as a base material and setting W as above, the tensile strength H and the shear strength S may be considerably close to each other. Accordingly, in terms of fastening strength of the female threaded body for verification 100 (Qn, En) and the male threaded body for verification 10 (Tn, Dn), substantially, the shear strength S may slightly increase or the tensile strength H may slightly increase as the thread angle T or the root diameter D varies. Which is predominant may be verified based on the fastening strength test and a boundary between a shear strength S predominant state and a tensile strength H predominant state may be found through the test.

For convenience of description, a case in which the root diameter D or the thread angle T varies using the matrix of FIG. 23 is described. However, in practice, there may be no need to prepare the male threaded body for verification 10 (Tn, Dn) and the female threaded body for verification 100 (Qn, En) to fill all the locations of the matrix. Also, there may be no need to form the matrix. As described in the following, through a combination of the male threaded body for verification and the female threaded body for verification such that the root diameter D and the thread angle T vary within a predetermined range, any aspect capable of extracting n optimal value may be applied.

<Boundary Root Diameter Extracting Process>

The fastening strength test is implemented by screwing the male threaded body for verification 10 (Tn, Dn) and the female threaded body for verification 100 (Qn, En) each constituting a single pair (hereinafter, referred to as a bolt and nut set for verification). Herein, referring to FIG. 24, the fastening strength test indicates a tensile test of relatively moving the male threaded body for verification 10 (Tn, Dn) and the female threaded body for verification 100 (Qn, En) to be separate from each other in a direction (refer to an arrow indicator A) away in the axial direction and compulsorily releasing a fastening state (a screwed state), however, is not limited thereto. In addition to a fatigue test of repeatedly separating the male threaded body 10 (Tn, Dn) and the female threaded body 100 (Qn, En), a so-called screw fastening test for verifying a torque, an axial force, and a rotational angle of a threaded body may be applied. A correlation between such test result and the result of the tensile test is verified. The fastening strength test may be implemented on all the bolt and nut sets for verification and whether the result thereof is a shaft break form in which fastening is released by separation from the shaft portion 12 of the male threaded body 10) or a thread collapse form in which the fastening is released by deformation or collapsing of the thread G is determined.

Figure 25:
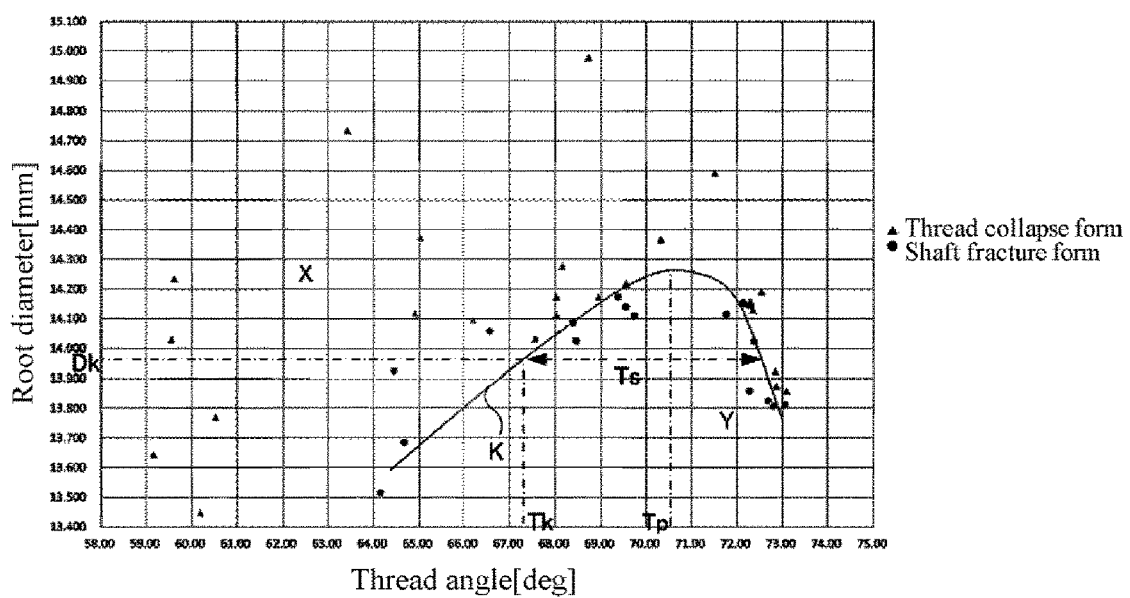
FIG. 25 is a graph illustrating a result of a fastening strength test on the male threaded body for verification and the female threaded body for verification of nominal diameter N16.

FIG. 25 illustrates an example of a graph of the determination result. In this graph, the thread angle Tn is set to a horizontal axis, the root diameter Dn is set to a vertical axis, the bolt and nut set for verification corresponding to the shaft break form is indicated with ○, and the bolt and nut set for verification corresponding to the thread collapse form is indicated with ▲. As known from this result, the graph is divided into two regions, i.e., a region X (thread collapse region X) in which the thread collapse form occurs and a region Y (shaft break region Y) in which the shaft break form occurs. A boundary line K therebetween may be clear on the graph. When a maximum root diameter value capable of causing the shaft break form with respect to a specific thread angle Tk is defined as a boundary root diameter Dk, the boundary line K indicates a correlation between a change of the thread angle Tk and a change of the boundary root diameter Dk.

For example, a design concept of setting the thread angle T to 68° and setting the root diameter D of the shaft portion to 14.1 mm or more belongs to the thread collapse region X. Therefore, it may be difficult to obtain the shaft break form when the fastening is released by the tensile test and there is a high probability that the thread collapse form may occur, and strength of the shaft portion may be useless accordingly. In the meantime, a design concept of setting the thread angle T to 68° and setting the root diameter D of the shaft portion to 13.6 mm may easily obtain the shaft break form when the fastening is released. However, the boundary root diameter Dk may be about 14.05 mm and, within this range, the root diameter D of the shaft portion may be set to be further great, which makes it possible to increase the tensile strength. In this aspect, the design is inefficient.

That is, in response to a change in the boundary root diameter Dk, a range of the boundary thread angle Tk (referred to as a boundary thread angle region Ts) that allows the male threaded body to be the shaft break form may be determined at the boundary line K.

<Shaft Break Predominant Thread Angle Selecting Process>

When the boundary root diameter extracting process is completed, a thread angle (hereinafter, shaft break predominant thread angle Tp) at which the boundary root diameter Dk may reach a maximum value is selected within the boundary line K. Referring to the graph of FIG. 25, the shaft break predominant thread angle Tp is 70.5° from a peak value of the boundary line K. The shaft break predominant thread angle Tp may be explained as a thread angle at which the shaft break form is easy to occur in the case of releasing of fastening, that is, a thread angle at which the shear strength S of the thread G is highest, although the tensile strength is increased by significantly increasing a thickness of the shaft portion.

<Thread Angle Determining Process>

Accordingly, a design is implemented by applying the thread angle approximate to the determined shaft break predominant thread angle Tp to the actual male threaded body 10 and/or female threaded body 100 at the nominal diameter N16. For example, if the actual thread angle T is set to 70°, the root diameter D may be set to be large. In detail, the root diameter D may be set to, for example, about 14.25 mm.

Figure 26:
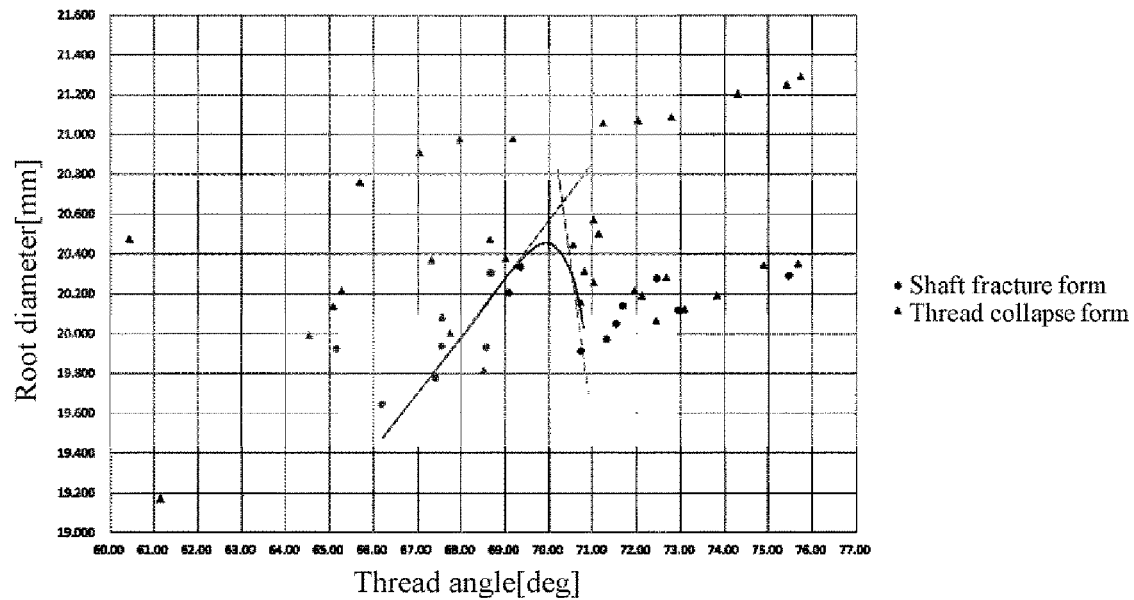
FIG. 26 is a graph illustrating a result of a fastening strength test on the male threaded body for verification and the female threaded body for verification of nominal diameter N24.
Figure 27:
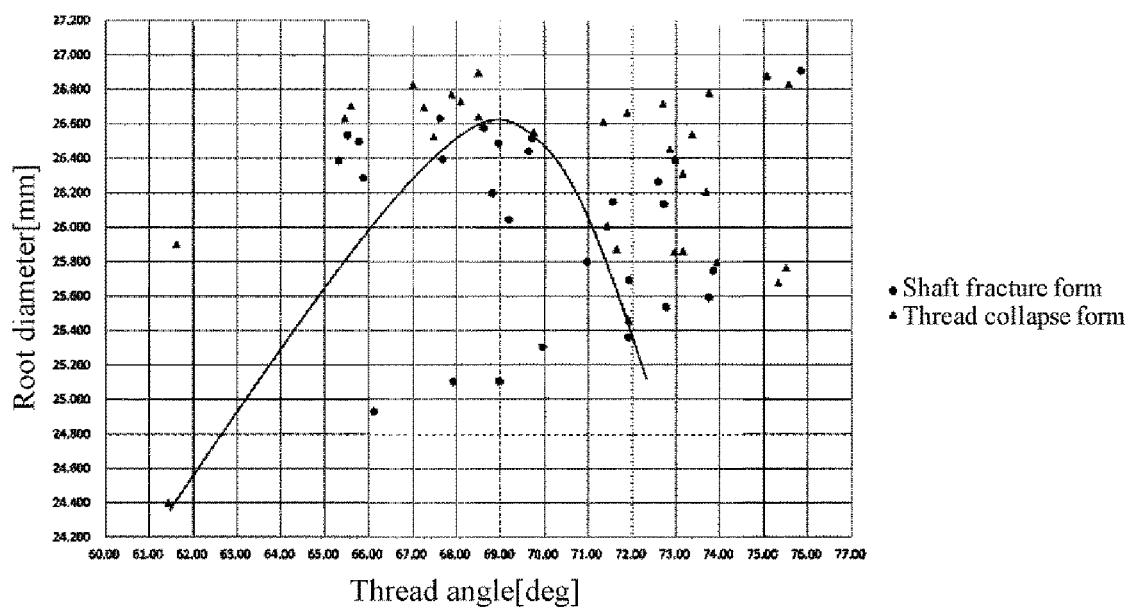
FIG. 27 is a graph illustrating a result of a fastening strength test on the male threaded body for verification and the female threaded body for verification of nominal diameter N30.

Also, although the design method in the case of the nominal diameter N16 is described with reference to FIG. 25, other nominal diameters may be used without being limited thereto. For example, FIG. 26 is a graph showing a verification result in the case of nominal diameter N24, and FIG. 27 is a graph showing a verification result in the case of nominal diameter N30. What is common in the graphs, the shaft break predominant thread angle Tp may be within the range of 61° or more or 75° or less, and, more desirably, within the range of 65° or more or 73° or less, and approximately around 70°. That is, in the case of the male threaded body 10 in the structure according to the present embodiment, the thread angle of the thread is not 60° that is a common value in the related art. That is, a value greater than 60° may be suitable and a value around 70° may be an optimal value.

Figure 28:
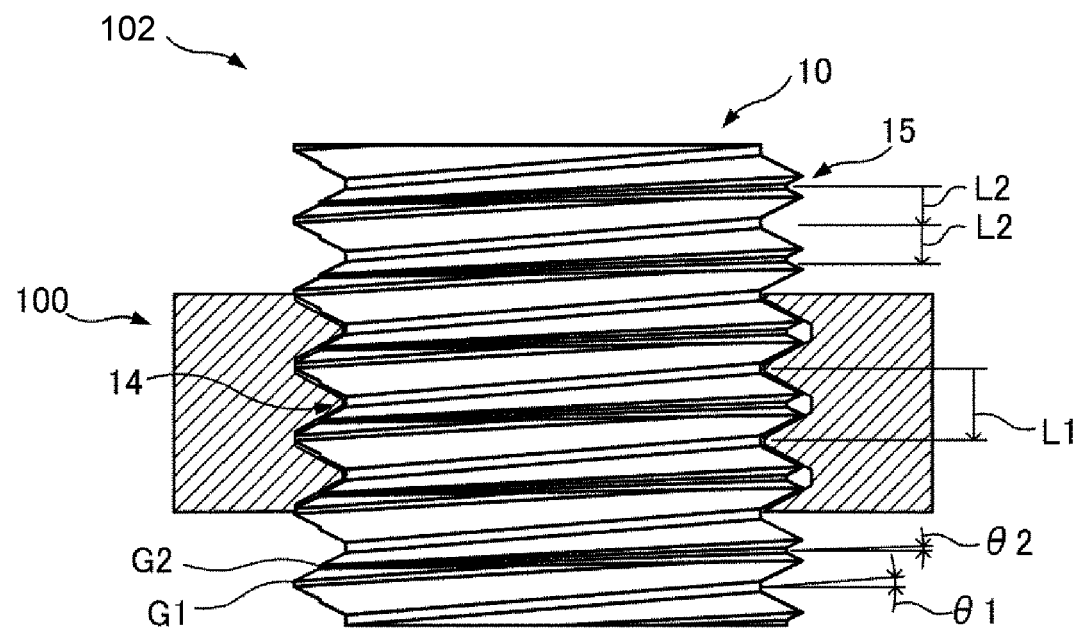
FIG. 28 is a front cross-sectional view illustrating a fastening structure of a male threaded body and a female threaded body according to another embodiment.

Also, in the male threaded body 10 and the female threaded body 100, a pair of the first spiral groove 14 and the female threaded spiral strip 114 and a pair of the second spiral groove 15 and the female threaded spiral strip 115 are in inverse relationship (having the same lead angle and opposite lead directions. However, embodiments are not limited thereto. For example, referring to FIG. 28, the first spiral groove 14 and the female threaded spiral strip 114, and the second spiral groove 15 and the female threaded spiral strip 115 having the same lead direction (L1, L2) and different lead angles may be used. In this case, by further superimposing another spiral groove having a different angle on the first spiral groove 14, the first spiral groove 14 having the lead L1 (lead angle θ1) and the second spiral groove 15 having the lead L2 (lead angle θ2) are formed with a screw direction aligned. In this case, a first thread G1 of the first spiral groove 14 and a second thread G2 of the second spiral groove 15 are not shared and separate. The embodiments may be applied to at least one or both of the threads G1 and G2. Here, a thread angle of the first thread G1 and a thread angle of the second thread G2 may differ from each other.

Although the embodiments are described based on an example in which the male threaded body 10 is in a double helical structure, the embodiments are not limited thereto. Although the design procedure is applied even to the male threaded body 10 in a single helical structure, an optimal thread angle may be clarified theoretically and/or experimentally.

As a result of the foregoing, the angle I or shape of the tool edge 2B of the tip 1 may be set so as to machine the threads and, for example, the angle I may be desirably set to substantially equal to or less than the "thread angle T." In an example in which the tip 1 cuts a base material with the tool edge in contact with one side of the base material, an angle J of the one side tool edge may be set to ½ of the angle I with respect to a direction perpendicular to the axis.

Further, features of the threaded bodies or thread angles will be described hereinafter.

(1) A male threaded body includes a shaft portion, a first spiral groove formed on a circumferential surface of the shaft portion and set to be an appropriate lead angle and/or lead direction, and a second spiral groove formed on the circumferential surface of the shaft portion and set to be a lead angle and/or lead direction that is different from the lead angle and/or lead direction of the first spiral groove, wherein the first spiral groove and the second spiral groove have a threaded portion formed by overlapping on the same region in an axial direction of the shaft portion, and when a cross-section of the threaded portion cut along the axial direction is viewed in an axial-orthogonal direction, a thread angle formed by a single pair of inclined surfaces extending from an apex to a valley of the thread is set to 61° or more or 75° or less.

(2) In relation to the male threaded body, the thread angle is set to 73° or less.

(3) In relation to the male threaded body, the thread angle is set to 65° or more.

(4) In relation to the male threaded body, the thread angle is set within the range of 70°±3°.

(5) A female threaded body includes a female threaded portion, wherein, when a cross-section of a female threaded portion constituting the female threaded portion and cut along an axial direction is viewed in an axial-orthogonal direction, a thread angle formed by a single pair of inclined surfaces extending from an apex to a valley of a thread of the female threaded portion is set to 61° or more or 75° or less.

(6) In relation to the female threaded body, the female threaded body is configured to screw with the male threaded body of any of the above descriptions.

(7) A threaded body design method includes a boundary root diameter extracting process of, in the case of implementing a fastening strength test of performing a relative separation in an axial direction by screwing a female threaded body for verification into a male threaded body for verification using a plurality of male threaded bodies for verification having a constant nominal diameter and different thread angles and root diameters and a plurality of female threaded bodies for verification configured to screw with the male threaded bodies for verification, extracting a degree of variation caused by the thread angle variate from the root diameter (hereinafter, referred to as boundary root diameter) around a boundary of a shaft break form and a thread collapse form by causing breakage of both the shaft break form in which a fastening state is released by separating the male threaded body for verification from a shaft portion and the thread collapse form in which the fastening state is released by deforming or shearing of a thread of the male threaded body for verification, a shaft break predominant thread angle selecting process of selecting the specific thread angle (hereinafter, shaft break predominant thread angle) based on the degree of variation of the boundary root diameter and at which the boundary root diameter is maximized, and a thread angle determining process of applying a thread angle close to the shaft break predominant thread angle to the actual male threaded body and/or the female threaded body in the nominal diameter.

(8) In relation to the threaded body design method, the boundary root diameter extracting process includes an individual boundary root diameter extracting process of, in the case of implementing the fastening strength test of performing the relative separation in the axial direction by screwing a female threaded body for verification with a male threaded body for verification using a plurality of male threaded bodies for verification having the constant thread angle and nominal diameter and different root diameters and a plurality of female threaded bodies for verification configured to screw with the male threaded bodies for verification, extracting the specific root diameter (hereinafter, boundary root diameter) around the boundary of the shaft break form and the thread collapse form by causing breakage of both the shaft break form in which fastening is released by separating the male threaded body for verification from the shaft portion and the thread collapse form in which fastening is released by deforming or shearing of the thread of the male threaded body for verification, and a process of extracting the degree of variation of the boundary root diameter caused by the thread angle variate by selecting the different plurality of thread angles and by repeatedly implement the individual boundary root diameter extracting process based on each thread angle.

(9) A male threaded body is designed based on the above threaded body design method.

(10) A female threaded body is designed based on the above threaded body design method.

(11) A thread structure is applied to a male threaded body and/or a female threaded body, and a thread angle formed by a single pair of inclined surfaces extending from an apex to a valley of a thread in the thread structure is set to 61° or more or 75° or less.

EXPLANATION OF SYMBOLS

1 Tip
2L1, 2L2 Cutting section
3 Main body section
4 Rake face
25 Tip holder
15L1, 15L2 Positioning face
25 Tip holder
27 Shank portion
30 Bolt hole
35 Tip-receiving hole
40 Lower jaw portion
45 Rake face
60 Holder side positioning face
70 Fastening screw
120 Tip holder
130 Throwaway tip
140 Male threaded body

The invention claimed is:

1. A cutting tool for performing cutting with respect to an external workpiece while relatively feeding the external workpiece in a predetermined direction, the external workpiece being shaft-supported to relatively rotate, the cutting tool comprising:
   a cutting section with a tool edge;
   a base section provided as one piece with or separate from the cutting section;
   a chip-guiding wall starting near the tool edge and being formed on an outer circumferential surface of the base section to extend in a direction away from the tool edge, the chip-guiding wall configured to interfere with a chip from the external workpiece and guide the chip in the direction away from the tool edge; and
   a discharge direction restricting face formed near the tool edge and configured to face a relative feeding direction of the external workpiece and the tool edge.

2. The cutting tool of claim 1, wherein the chip-guiding wall is formed spirally on an outer circumference of the base section.

3. The cutting tool of claim 2, wherein the chip-guiding wall is configured to turn in a circumferential direction opposite to a cutting direction of the tool edge in the direction away from the tool edge with respect to the external workpiece.

4. The cutting tool of claim 1, wherein the chip-guiding wall is positioned opposite a cutting face of the tool edge.

5. The cutting tool of claim 1, wherein the base section is a rod-shaped shank portion, and
   the tool edge is disposed to protrude in a radial direction of the shank portion.

6. The cutting tool of claim 1, wherein at least a portion of the chip-guiding wall is in substantially a same lateral position as the tool edge with respect to a relative feeding direction of the external workpiece and the tool edge and has a tool edge side erect face positioned erect with respect to the cutting face of the tool edge.

7. The cutting tool of claim 1, wherein the chip-guiding wall is configured to branch into a first guiding wall piece and a second guiding wall piece in the middle of extending in the direction away from the tool edge.

8. The cutting tool of claim 1, wherein the discharge direction restricting face is disposed on a forward side of the tool edge in the relative feeding direction and configured to face a backward side of the tool edge, with respect to the tool edge.

9. The cutting tool of claim 1, further comprising:
   a discharge direction restricting face formed near the tool edge and configured to face a relative feeding direction of the external workpiece and the tool edge,
   wherein at least a portion of the chip-guiding wall is in substantially a same lateral position as the tool edge with respect to the relative feeding direction of the external workpiece and the tool edge and has a tool edge side erect face positioned erect with respect to the cutting face of the tool edge,
   wherein the discharge direction restricting face and the chip-guiding wall are continuous.

10. The cutting tool of claim 1, wherein the cutting tool is provided for inner diameter machining or female threading.

* * * * *